(12) United States Patent
Hasegawa et al.

(10) Patent No.: US 11,850,828 B2
(45) Date of Patent: Dec. 26, 2023

(54) METHOD FOR MANUFACTURING MULTI-LAYER STACK AND MULTI-LAYER STACK

(71) Applicant: Panasonic Intellectual Property Management Co., Ltd., Osaka (JP)

(72) Inventors: Kenji Hasegawa, Osaka (JP); Eiichi Uriu, Osaka (JP); Tasuku Ishibashi, Ishikawa (JP); Hiroyuki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 171 days.

(21) Appl. No.: 17/599,130

(22) PCT Filed: Mar. 25, 2020

(86) PCT No.: PCT/JP2020/013321
§ 371 (c)(1),
(2) Date: Sep. 28, 2021

(87) PCT Pub. No.: WO2020/203550
PCT Pub. Date: Oct. 8, 2020

(65) Prior Publication Data
US 2022/0152993 A1    May 19, 2022

(30) Foreign Application Priority Data

Mar. 29, 2019 (JP) .................................. 2019-069217

(51) Int. Cl.
*B32B 17/10*    (2006.01)
*E06B 3/66*    (2006.01)
(Continued)

(52) U.S. Cl.
CPC ........ *B32B 17/10871* (2013.01); *B32B 17/10* (2013.01); *B32B 17/10073* (2013.01);
(Continued)

(58) Field of Classification Search
CPC .............. B32B 17/10871; B32B 17/10; B32B 17/10073; B32B 17/10761; E06B 3/6612;
(Continued)

(56) References Cited

U.S. PATENT DOCUMENTS 5,891,536 A * 4/1999 Collins ............... E06B 3/66304
52/786.13
6,054,195 A  4/2000 Collins et al.
(Continued)

FOREIGN PATENT DOCUMENTS

EP    3950627 A1    2/2022
JP    H10-507500 A    7/1998
(Continued)

OTHER PUBLICATIONS

European Extended Search Report dated Nov. 21, 2022 issued for the related European Patent Application No. 20881926.8.
(Continued)

*Primary Examiner* — Michael M. Bernshteyn
(74) *Attorney, Agent, or Firm* — Rimon P.C.

(57) ABSTRACT

A method for manufacturing a multi-layer stack includes bonding a transparent plate to an outer surface of at least one of a first glass panel or a second glass panel of a glass panel unit with an intermediate film interposed therebetween. The glass panel unit includes: the first glass panel; the second glass panel; and an evacuated space provided between the first glass panel and the second glass panel. A plurality of spacers are provided in the evacuated space between the first glass panel and the second glass panel. A pressure applied for bonding the glass panel unit and the transparent plate together is less than a compressive strength of the plurality of spacers.

9 Claims, 8 Drawing Sheets

(51) Int. Cl.
*E06B 3/663* (2006.01)
*E06B 3/67* (2006.01)
*E06B 3/673* (2006.01)

(52) U.S. Cl.
CPC ...... *B32B 17/10761* (2013.01); *E06B 3/6612* (2013.01); *E06B 3/66304* (2013.01); *E06B 3/6707* (2013.01); *E06B 3/6715* (2013.01); *E06B 3/6736* (2013.01)

(58) Field of Classification Search
CPC .. E06B 3/66304; E06B 3/6707; E06B 3/6715; E06B 3/6736
USPC .......................................................... 428/34
See application file for complete search history.

(56) References Cited

U.S. PATENT DOCUMENTS

| | | | |
|---|---|---|---|
| 6,071,575 | A | 6/2000 | Collins et al. |
| 6,083,578 | A | 7/2000 | Collins et al. |
| 2006/0154005 | A1* | 7/2006 | Misonou .............. C03C 27/10 428/34 |
| 2010/0215966 | A1 | 8/2010 | Ito et al. |
| 2011/0247754 | A1 | 10/2011 | Canfield |
| 2013/0004735 | A1 | 1/2013 | Ito et al. |
| 2014/0034218 | A1 | 2/2014 | Hogan et al. |
| 2016/0096344 | A1 | 4/2016 | Kurihara |
| 2016/0193818 | A1 | 7/2016 | Hogan et al. |
| 2017/0361598 | A1 | 12/2017 | Hogan et al. |
| 2019/0168496 | A1 | 6/2019 | Hogan et al. |
| 2019/0195003 | A1 | 6/2019 | Abe et al. |
| 2019/0270215 | A1 | 9/2019 | Shimizu et al. |
| 2019/0329530 | A1 | 10/2019 | Gier et al. |
| 2020/0361110 | A1 | 11/2020 | Shimizu et al. |
| 2022/0152993 | A1 | 5/2022 | Hasegawa et al. |

FOREIGN PATENT DOCUMENTS

| | | | | |
|---|---|---|---|---|
| JP | 2002-321948 | A | | 11/2002 |
| JP | 2004-323317 | A | | 11/2004 |
| JP | 2004323317 | A | * | 11/2004 |
| JP | 2013-047007 | A | | 3/2013 |
| JP | 2015-529623 | A | | 10/2015 |
| JP | 2018-532678 | A | | 11/2018 |
| KR | 10-2018-0015205 | A | | 2/2018 |
| WO | 96/12862 | A1 | | 5/1996 |
| WO | 2004/016563 | A1 | | 2/2004 |
| WO | 2005/000762 | A1 | | 1/2005 |
| WO | 2012/157616 | A1 | | 11/2012 |
| WO | WO-2012157616 | A1 | * | 11/2012 ....... B32B 17/10055 |
| WO | 2014/022118 | A1 | | 2/2014 |
| WO | 2015/019925 | A1 | | 2/2015 |
| WO | 2018/043376 | A1 | | 3/2018 |
| WO | 2018/088539 | A1 | | 5/2018 |

OTHER PUBLICATIONS

Extended European Search Report dated Apr. 25, 2022 issued in the corresponding European Patent Application No. 20783156.1.
International Search Report and Written Opinion issued in corresponding International Patent Application No. PCT/JP2020/036963, dated Dec. 1, 2020; with partial English translation.
International Search Report and Written Opinion issued in corresponding International Patent Application No. PCT/JP2020/013321, dated Jun. 23, 2020; with partial English translation.

* cited by examiner

METHOD FOR MANUFACTURING MULTI-LAYER STACK AND MULTI-LAYER STACK

CROSS-REFERENCE OF RELATED APPLICATIONS

This application is the U.S. National Phase under 35 U.S.C. § 371 of International Patent Application No. PCT/JP2020/013321, filed on Mar. 25, 2020, which in turn claims the benefit of Japanese Application No. 2019-069217, filed on Mar. 29, 2019, the entire disclosures of which Applications are incorporated by reference herein.

TECHNICAL FIELD

The present disclosure generally relates to a method for manufacturing a multi-layer stack and a multi-layer stack. More particularly, the present disclosure relates to a method for manufacturing a multi-layer stack including a glass panel unit, a transparent plate, and an intermediate film and a multi-layer stack having such a structure.

BACKGROUND ART

A glass panel unit has been known in the art as a structure, of which the thermal insulation properties are improved by providing an evacuated space between two glass panels facing each other. For example, Patent Literature 1 discloses a vacuum-insulated glass window unit, in which a space is provided between two glass substrates.

There has been an increasing demand for glass panel units with further improved thermal insulation properties and mechanical strength compared to the glass panel unit disclosed in Patent Literature 1.

CITATION LIST

Patent Literature

Patent Literature 1: JP 2015-529623 A

SUMMARY OF INVENTION

An object of the present disclosure is to provide a method for manufacturing a multi-layer stack with excellent thermal insulation properties and mechanical strength and also provide a multi-layer stack with such properties.

A method for manufacturing a multi-layer stack according to an aspect of the present disclosure includes bonding a transparent plate to an outer surface of at least one of a first glass panel or a second glass panel of a glass panel unit with an intermediate film interposed between the outer surface and the transparent plate. The glass panel unit includes: the first glass panel; the second glass panel; and an evacuated space provided between the first glass panel and the second glass panel. A plurality of spacers are provided in the evacuated space between the first glass panel and the second glass panel. A pressure applied for bonding the glass panel unit and the transparent plate together is less than a compressive strength of the plurality of spacers.

A multi-layer stack according to another aspect of the present disclosure includes a glass panel unit, a first transparent plate, a first intermediate film, a second transparent plate, and a second intermediate film. The glass panel unit includes: a first glass panel; a second glass panel; and an evacuated space provided between the first glass panel and the second glass panel. A plurality of spacers are provided in the evacuated space between the first glass panel and the second glass panel. The first transparent plate is provided for an outer surface of the first glass panel. The first intermediate film is interposed between the first glass panel and the first transparent plate. The second transparent plate is provided for an outer surface of the second glass panel of the glass panel unit. The second intermediate film is interposed between the second glass panel and the second transparent plate.

DESCRIPTION OF EMBODIMENTS

1. First Embodiment

1-1. Overview of First Embodiment

Figure 1A:
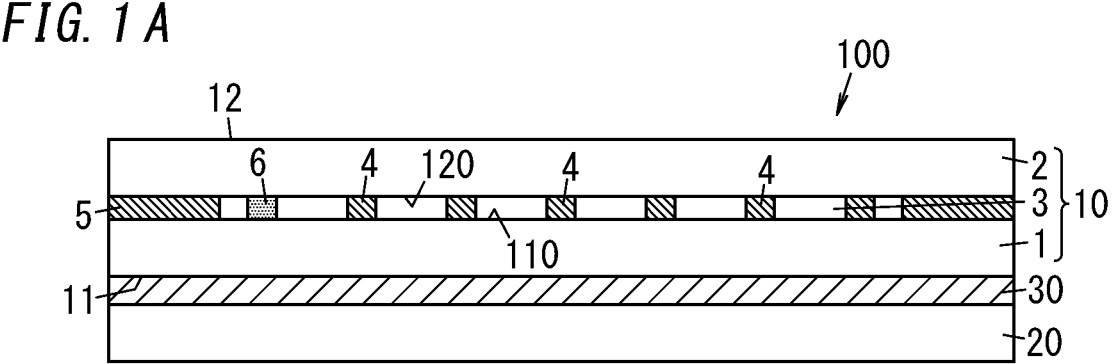
FIG. 1A is a schematic cross-sectional view illustrating an exemplary multi-layer stack according to a first embodiment.
Figure 2A:
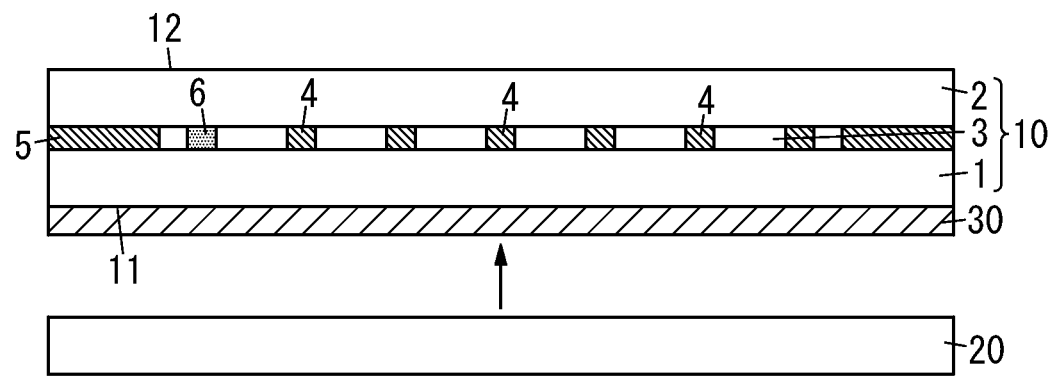
FIGS. 2A and 2B are schematic cross-sectional views illustrating an exemplary method for manufacturing the multi-layer stack according to the first embodiment.

In a method for manufacturing a multi-layer stack 100 according to a first embodiment of the present disclosure, a transparent plate 20 is bonded to an outer surface 11, 12 of at least one of a first glass panel 1 or a second glass panel 2 of a glass panel unit 10 with an intermediate film 30 interposed between the outer surface 11, 12 and the transparent plate 20 as shown in FIGS. 1A and 2A.

The glass panel unit 10 includes: the first glass panel 1; the second glass panel 2; and an evacuated space 3 provided between the first glass panel 1 and the second glass panel 2.

As used herein, the outer surface 11 of the first glass panel 1 is a surface, facing away from the second glass panel 2, of the first glass panel 1 and is one surface with the first glass panel 1 of the glass panel unit 10. Also, as used herein, the outer surface 12 of the second glass panel 2 is a surface, facing away from the first glass panel 1, of the second glass panel 2 and is the other surface with the second glass panel 2 of the glass panel unit 10.

A plurality of spacers 4 are provided in the evacuated space 3 between the first glass panel 1 and the second glass panel 2. A pressure applied for bonding the glass panel unit 10 and the transparent plate 20 together is less than a compressive strength of the plurality of spacers 4. As used herein, the "compressive strength" is a value representing, by force per unit area, the maximum load that a given structure can withstand before the structure is broken under the pressure (compression force).

Figure 1B:
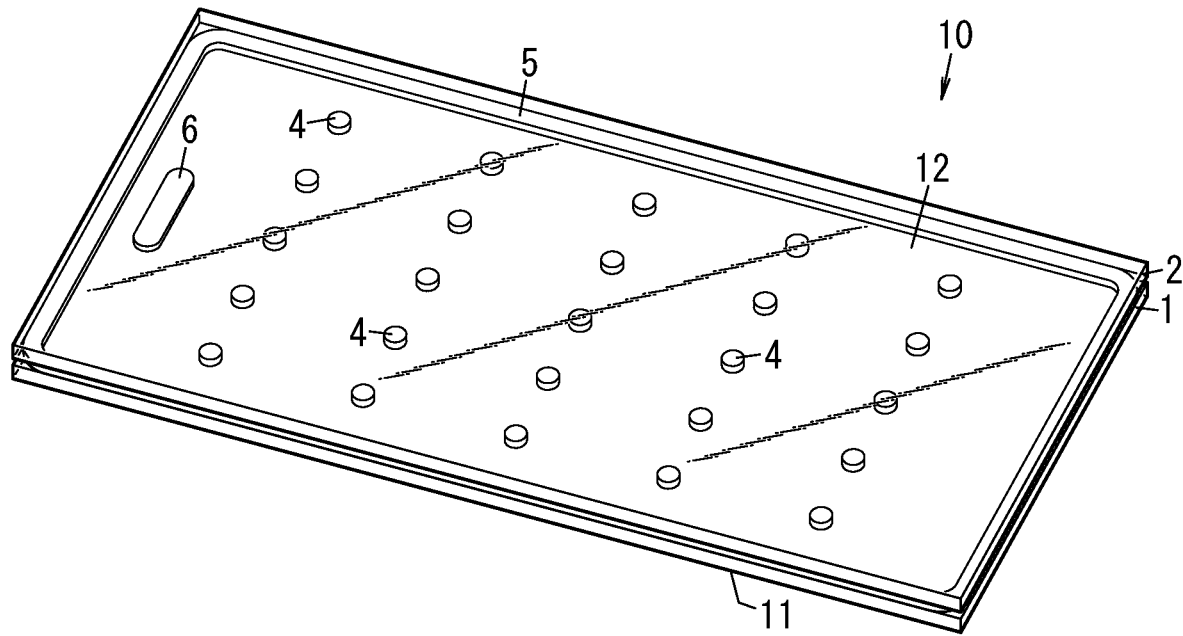
FIG. 1B is a schematic perspective view illustrating a glass panel unit included in the multi-layer stack shown in FIG. 1A.

In the multi-layer stack 100 obtained by the manufacturing method according to this embodiment, the transparent plate 20 is bonded, via the intermediate film 30 (see FIG. 1A), to the glass panel unit 10 in which the evacuated space 3 is provided between the first glass panel 1 and the second glass panel 2 (see FIG. 1B). Thus, the multi-layer stack 100 has thermal insulation properties and mechanical strength superior to those of the glass panel unit 10.

In addition, according to this embodiment, the pressure applied for bonding the glass panel unit 10 and the transparent plate 20 together is less than the compressive strength of the spacers 4. This reduces the chances of the spacers 4 collapsing under pressure when the glass panel unit 10 and the transparent plate 20 are bonded together. If the spacers 4 collapsed under the pressure, then the evacuated space 3 would be compressed to cause a decline in the thermal insulation properties of the multi-layer stack 100. In addition, if the spacers 4 collapsed under the pressure, the mechanical strength of the multi-layer stack 100 would decrease as well. Thus, avoiding the collapse of the spacers 4 may reduce the chances of causing a decline in the thermal insulation properties and mechanical strength of the multi-layer stack 100.

The material of the spacers 4 is not limited to any particular one but the spacers 4 are suitably made of a resin. Suppose, for example, a situation where the spacers 4 are made of a metallic material such as stainless steel and have a compressive strength equal to or greater than the compressive strength of glass (i.e., a material for the first glass panel 1 or the second glass panel 2). In that case, if the pressure for bonding the glass panel unit 10 and the transparent plate 20 goes beyond a required level, then the metallic spacers 4 might break the first glass panel 1 or the second glass panel 2. According to this embodiment, however, the spacers 4 are made of a resin and the compressive strength of the spacers 4 is less than the compressive strength of glass. This reduces, even if the pressure for bonding the glass panel unit 10 and the transparent plate 20 goes beyond a required level, the chances of the first glass panel 1 or the second glass panel 2 being broken under the excessive pressure.

Thus, the multi-layer stack 100 obtained by the manufacturing method according to this embodiment may have excellent mechanical strength and thermal insulation properties. Note that the spacers 4 do not have to be made of a resin but may also be made of a ceramic or a metal.

1-2. Details of First Embodiment

Next, the multi-layer stack 100 according to the first embodiment and a method for manufacturing the same will be described in detail.

1-2-1. Multi-Layer Stack

The multi-layer stack 100 according to this embodiment includes the glass panel unit 10, the transparent plate 20, and the intermediate film 30 as shown in FIG. 1A. These constituent elements will be described one by one.

(1) Glass Panel Unit

The glass panel unit 10 includes the first glass panel 1 and the second glass panel 2, which face each other as shown in FIG. 1B. Thus, the first glass panel 1 and the second glass panel 2 are stacked one on top of the other.

In the glass panel unit 10, a sealant 5 is provided between the first glass panel 1 and the second glass panel 2. The sealant 5 according to this embodiment has a frame shape and is used to hermetically bond the first glass panel 1 and the second glass panel 2 together. Thus, in this glass panel unit 10, the first glass panel 1, the sealant 5, and the second glass panel 2 are stacked in this order one on top of another.

In addition, the glass panel unit 10 also includes the evacuated space 3. The evacuated space 3 is a space surrounded with the first glass panel 1, the second glass panel 2, and the sealant 5.

Furthermore, in the glass panel unit 10, a plurality of spacers (pillars) 4 are provided in the evacuated space 3 between the first glass panel 1 and the second glass panel 2. These spacers 4 may maintain a predetermined interval (gap distance) between the first glass panel 1 and the second glass panel 2.

Besides, in this glass panel unit 10, a gas adsorbent 6 is further provided in the evacuated space 3. The gas adsorbent 6 may adsorb a gas in the evacuated space 3.

Next, the first glass panel 1, the second glass panel 2, the sealant 5, the evacuated space 3, the spacers 4, and the gas adsorbent 6 that form the glass panel unit 10 will be described in further detail.

(i) First Glass Panel

The first glass panel 1 is a plate member of glass. The first glass panel 1 may have a rectangular shape in a plan view. However, the planar shape of the first glass panel 1 does not have to be rectangular but may also be a triangular or any other polygonal shape, a circular shape, or an elliptical shape. The first glass panel 1 may have a flat plate shape or may also have a curved plate shape. That is to say, the outer surface 11 of the first glass panel 1 may be either flat or curved, whichever is appropriate.

Examples of materials for the first glass panel 1 include soda lime glass, high strain point glass, chemically tempered glass, alkali-free glass, quartz glass, Neoceram, and thermally tempered glass. The thickness of the first glass panel 1 is not limited to any particular value but may fall within the range from 1 mm to 10 mm, for example.

The first glass panel 1 has the outer surface 11, which is a surface exposed to the external environment outside of the glass panel unit 10, and a surface 110 facing the second glass panel 2 (see FIG. 1B).

Optionally, a low-emissivity film may be provided on the surface 110. In that case, the low-emissivity film is located in the evacuated space 3. The low-emissivity film is a film containing a metal with low emissivity. The low-emissivity film has the capability of reducing the transfer of heat by radiation, and therefore, may reduce the transfer (emission) of the heat, generated by light (radiation) irradiating the outer surface 11, to the evacuated space 3. Examples of metals having low emissivity include silver.

(ii) Second Glass Panel

The second glass panel 2 is a plate member of glass. The second glass panel 2 has the same planar shape as the first glass panel 1 (see FIG. 1B). The second glass panel 2 may have a flat plate shape or may also have a curved plate shape. That is to say, the outer surface 12 of the second glass panel 2 of the glass panel unit 10 may be either flat or curved, whichever is appropriate. In other words, the glass panel unit 10 may have a flat plate shape or a curved plate shape, whichever is appropriate.

Examples of materials for the second glass panel 2 include soda lime glass, high strain point glass, chemically tempered glass, alkali-free glass, quartz glass, Neoceram, and thermally tempered glass. The material for the second glass panel 2 may be the same as, or different from, the material for the first glass panel 1. The thickness of the second glass panel 2 is not limited to any particular value but may fall within the range from 1 mm to 10 mm, for example. The thickness of the second glass panel 2 may be the same as, or different from, the thickness of the first glass panel 1.

The second glass panel 2 has the outer surface 12, which is a surface exposed to the external environment outside of the glass panel unit 10, and a surface 120 facing the first glass panel 1 (see FIG. 1B).

(iii) Sealant

The sealant 5 is a frame-shaped member (see FIG. 1B). In this embodiment, the first glass panel 1 and the second glass panel 2 have a rectangular shape in a plan view, and therefore, the sealant 5 is also a rectangular frame shaped member. The sealant 5 is provided between the first glass panel 1 and the second glass panel 2 to hermetically bond the first glass panel 1 and the second glass panel 2 together.

The sealant 5 is made of a hot glue. As the hot glue, a glass frit such as a low-melting glass frit may be used, for example. Examples of the low-melting glass frit include a bismuth-based glass frit, a lead-based glass frit, and a vanadium-based glass frit. The sealant 5 may contain one or more types of low-melting glass frits selected from this group.

(iv) Evacuated Space

The evacuated space 3 is a space surrounded with the first glass panel 1, the second glass panel 2, and the sealant 5 (see FIG. 1B). More specifically, the evacuated space 3 is a space surrounded with the surface 110 of the first glass panel 1, the surface 120 of the second glass panel 2, and the sealant 5.

The evacuated space 3 is suitably a vacuum space, for example. Specifically, the evacuated space 3 is suitably a space evacuated to a degree of vacuum of 0.1 Pa or less. This would improve the thermal insulation properties of the glass panel unit 10.

(v) Spacer

A plurality of spacers 4 are provided in the evacuated space 3 as shown in FIG. 1B. That is to say, a plurality of spacers 4 are arranged between the first glass panel 1 and the second glass panel 2. The plurality of spacers 4 may maintain a predetermined interval between the first glass panel 1 and the second glass panel 2. This ensures a predetermined gap distance between the first glass panel 1 and the second glass panel 2 and also ensures that the thickness of the evacuated space 3 is kept constant.

Each of the spacers 4 is a circular columnar member. The height (i.e., the dimension in the thickness direction) of the spacers 4 may be set appropriately according to the gap distance between the first glass panel 1 and the second glass panel 2. That is to say, the gap distance between the first glass panel 1 and the second glass panel 2 (i.e., the thickness of the evacuated space 3) is defined by the height of the spacers 4. The height of the spacers 4 may fall, for example, within the range from 10 µm to 1000 µm.

The diameter of the spacers 4 may fall, for example, within the range from 0.1 mm to 10 mm. For example, spacers 4 with a diameter of 0.5 mm and a height of 100 µm may be used. The shape of the spacers 4 does not have to be circular columnar but may also be a rectangular columnar shape or a spherical shape.

The spacers 4 are suitably transparent. This would make the spacers 4 much less conspicuous in the multi-layer stack 100 and thereby improve the appearance of the multi-layer stack 100.

The spacers 4 according to this embodiment are made of a resin and are suitably made of a polyimide resin, for example. This would reduce the thermal conductivity of the spacers 4 and thereby reduce the transfer of heat between the first glass panel 1 and the second glass panel 2 that are in contact with the spacers 4.

(vi) Gas Adsorbent

The gas adsorbent 6 has the capability of adsorbing gas molecules. The gas adsorbent 6 is placed in the evacuated space 3. The gas adsorbent 6 may adsorb a gas in the evacuated space 3, thus increasing the degree of vacuum in the evacuated space 3 and thereby improving the thermal insulation properties of the glass panel unit 10.

The gas adsorbent 6 may include, for example, a metallic getter material or a non-metallic getter material.

The metallic getter material is a getter material having a metallic surface that may chemically adsorb gas molecules. Examples of the metallic getter materials include zirconium-based (such as Zr—Al and Zr—V—Fe) getter materials and titanium-based getter materials. Each of these metallic getter materials may adsorb molecules of a gas such as $H_2O$, $N_2$, $O_2$, $H_2$, or $CO_2$. In addition, heating and activating any of these metallic getter materials may also cause the gas molecules, chemically adsorbed into the metallic surface of the metallic getter material, to diffuse inside the metallic getter material. Thus, the gas adsorbent 6 containing the metallic getter material may adsorb molecules of a gas such as $H_2O$, $N_2$, $O_2$, $H_2$, or $CO_2$ in the evacuated space 3.

The non-metallic getter material is a getter material having a porous structure with the ability to adsorb gas molecules. Examples of the non-metallic getter materials include zeolite-based getter materials, active carbon, and magnesium oxide. The zeolite-based getter material may include ion-exchanged zeolite. In that case, examples of the ion exchange materials include K, $NH_4$, Ba, Sr, Na, Ca, Fe, Al, Mg, Li, H, and Cu. Each of these non-metallic getter materials is able to adsorb molecules of a gas such as a hydrocarbon-based gas (such as $CH_4$ and $C_2H_6$) or ammonia ($NH_3$) gas that a metallic getter material cannot adsorb. In addition, heating and activating any of these non-metallic getter materials may cause the gas molecules, which have been adsorbed into the porous structure of the non-metallic getter material, to be desorbed.

(vii) Method for Manufacturing Glass Panel Unit

The glass panel unit 10 may be manufactured by, for example, the following method.

First, a hot glue is applied in a frame shape onto the surface 120 of the second glass panel 2. Next, the first glass panel 1 is laid on top of the second glass panel 2 such that the frame-shaped hot glue is sandwiched between the first glass panel 1 and the second glass panel 2. Then, the space surrounded with the first glass panel 1, the second glass panel 2, and the frame-shaped hot glue is heated. This process step may be performed by heating, in a heating furnace, the multi-layer stack in which the first glass panel 1 and the second glass panel 2 are stacked one on top of the other with the hot glue interposed between themselves. In this manner, the sealant 5 is formed out of the frame-shaped hot glue. In addition, a gas is exhausted from the space surrounded with the first glass panel 1, the second glass panel 2, and the hot glue, thus creating the evacuated space 3. In this manner, the glass panel unit 10 may be manufactured.

(2) Transparent Plate

The transparent plate 20 is a transparent plate member with light-transmitting properties. The transparent plate 20 not only improves the mechanical strength, thermal insulation properties, and sound insulation of the multi-layer stack 100 but also imparts various functions to the multi-layer stack 100 according to the shape, capability, or any other parameter of the transparent plate 20. The transparent plate 20 is provided for the outer surface 11, 12 of at least one of the first glass panel 1 or the second glass panel 2 of the glass panel unit 10 as described above. In the multi-layer stack 100 according to this embodiment, the transparent plate 20 is provided for the outer surface 11 of the glass panel unit 10 as shown in FIG. 1A. Thus, the transparent plate 20 faces the glass panel unit 10. In addition, the transparent plate 20 also faces the first glass panel 1.

The planar shape of the transparent plate 20 may be the same as the planar shape of the glass panel unit 10, for example. In the multi-layer stack 100 according to this embodiment, the transparent plate 20 has the same planar shape as the first glass panel 1. The glass panel unit 10 may be flat or curved as described above. Accordingly, the transparent plate 20 may also be flat or curved, whichever is appropriate.

The thickness of the transparent plate 20 is not limited to any particular value but suitably falls, for example, within the range from 0.5 mm to 12 mm, and more suitably falls within the range from 1 mm to 6 mm. This may reduce the weight of the multi-layer stack 100 while ensuring sufficient mechanical strength for the multi-layer stack 100.

The material for the transparent plate 20 is not limited to any particular one as long as the material has light-transmitting properties.

For example, the transparent plate 20 is suitably made of polycarbonate. In other words, the transparent plate 20 is suitably a polycarbonate plate. This may reduce the weight of the transparent plate 20 and thereby reduce the overall weight of the multi-layer stack 100.

The transparent plate 20 is suitably made of glass, for example. In other words, the transparent plate 20 is suitably a glass pane. This may increase the mechanical strength of the transparent plate 20 and eventually increase the mechanical strength of the multi-layer stack 100. If the transparent plate 20 is made of glass, examples of materials for the transparent plate 20 include annealed glass, chemically tempered glass, and thermally tempered glass.

(3) Intermediate Film

The intermediate film 30 is interposed between the glass panel unit 10 and the transparent plate 20 as described above. Thus, in the multi-layer stack 100 according to this embodiment, the intermediate film 30 is interposed between the first glass panel 1 and the transparent plate 20.

In the multi-layer stack 100, the glass panel unit 10 and the transparent plate 20 are bonded together with this intermediate film 30. In the multi-layer stack 100 according to this embodiment, the first glass panel 1 and the transparent plate 20 are bonded together with the intermediate film 30. Thus, the intermediate film 30 is suitably provided over not only the entire surface of the (first glass panel 1 of the) glass panel unit 10 but also the entire surface of the transparent plate 20. The planar shape of the intermediate film 30 is suitably the same as not only that of the (first glass panel 1 of the) glass panel unit 10 but also that of the transparent plate 20 as well.

The thickness of the intermediate film 30 is not particularly limited to any particular value as long as the intermediate film 30 may bond the (first glass panel 1 of the) glass panel unit 10 and the transparent plate 20 together but suitably falls, for example, within the range from 0.3 mm to 4 mm and more suitably falls within the range from 0.3 mm to 2 mm. This allows the glass panel unit 10 to hold the transparent plate 20 easily and also facilitates maintaining the light-transmitting properties of the multi-layer stack 100.

The material for the intermediate film 30 is not limited to any particular one as long as the intermediate film 30 may bond the (first glass panel 1 of the) glass panel unit 10 and the transparent plate 20 together and has light-transmitting properties. For example, the material for the intermediate film 30 is suitably a sheet-shaped resin with light-transmitting properties and is more suitably a sheet of a thermoplastic resin. The intermediate film 30 may be configured as a single sheet of resin or a multi-layer stack made up of multiple sheets of resin. If the intermediate film 30 is configured as a multi-layer stack of multiple sheets of resin, some matter may be interposed between the multiple sheets of resin to improve its design and decorativeness. Examples of such interposed materials include a PET film, a sheet of metal foil, and a plant.

The intermediate film 30 is suitably made of a polyvinyl butyral (PVB) resin, for example. The PVB resin is suitable because the PVB resin not only is able to bond the glass panel unit 10 and the transparent plate 20 firmly but also has excellent transparency. In addition, the PVB resin may also increase the mechanical strength of the multi-layer stack 100. Moreover, the PVB resin increases the anti-penetration ability of the multi-layer stack 100 as well. Thus, if the multi-layer stack 100 is required to have high mechanical strength, then the intermediate film 30 is suitably made of a polyvinyl butyral (PVB) resin.

The intermediate film 30 is also suitably made of an ethylene vinyl acetate (EVA) copolymer resin. The EVA resin is suitable due to its excellent transparency and flexibility. In addition, the EVA resin also increases the anti-scattering ability of the multi-layer stack 100. Furthermore, the EVA resin also allows the glass panel unit 10 and the transparent plate 20 to be bonded at a relatively low temperature with the intermediate film 30. Moreover, the EVA resin increases the transportability of the multi-layer stack 100 as well.

The intermediate film 30 is also suitably made of a cycloolefin resin, for example. The cycloolefin resin is suitable due to its excellent transparency and flexibility. In addition, the cycloolefin resin also increases the anti-scattering ability of the multi-layer stack 100. Furthermore, the cycloolefin resin also allows the glass panel unit 10 and the transparent plate 20 to be bonded at a relatively low temperature with the intermediate film 30. Moreover, the cycloolefin resin increases the transportability of the multi-layer stack 100 as well.

The intermediate film 30 is also suitably made of an ionomer resin, for example. The ionomer resin is suitable due to its excellent transparency and flexibility and high mechanical strength. In addition, the ionomer resin also increases the anti-scattering ability of the multi-layer stack 100. Furthermore, the ionomer resin also allows the glass panel unit 10 and the transparent plate 20 to be bonded at a relatively low temperature with the intermediate film 30. Moreover, the ionomer resin increases the transportability of the multi-layer stack 100 as well. As used herein, the "ionomer resin" refers to a resin with a special structure in which the molecules of an ethylene-methacrylic acid copolymer or an ethylene-acrylic acid copolymer are bonded together by intermolecular bonding with ions of a metal such as sodium or zinc.

The intermediate film 30 is also suitably made of a polyolefin resin, for example. The polyolefin resin has excellent transparency and flexibility. In addition, the polyolefin resin also increases the anti-scattering ability of the multi-layer stack 100. Furthermore, the polyolefin resin also allows the glass panel unit 10 and the transparent plate 20 to be bonded at a relatively low bonding temperature falling within the range from 80° C. to 110° C. with the intermediate film 30. Moreover, the polyolefin resin increases the transportability of the multi-layer stack 100 as well.

Thus, according to this embodiment, the intermediate film 30 suitably includes at least one resin selected from the group consisting of a polyvinyl butyral resin, an ethylene vinyl acetate copolymer resin, a cycloolefin resin, an ionomer resin, and a polyolefin resin.

The intermediate film 30 is also suitably made of a liquid curable resin, for example. The liquid curable resin is suitably either a thermosetting resin or a UV curable resin. If the intermediate film 30 is made of a thermosetting resin, the intermediate film 30 suitably includes not only the thermosetting resin but also a curing agent as well. On the other hand, if the intermediate film 30 is made of a UV curable resin, then the intermediate film 30 suitably includes not only the UV curable resin but also a photopolymerization initiator as well. Examples of such curable resins include an acrylic resin. That is to say, the intermediate film 30 is suitably made of an acrylic resin as well.

1-2-2. Method for Manufacturing Multi-Layer Stack

The multi-layer stack 100 according to this embodiment may be manufactured by performing, for example, the following process steps. Note that the following method for manufacturing the multi-layer stack 100 is only an example and should not be construed as limiting.

First, the glass panel unit 10, the transparent plate 20, and the intermediate film 30 are provided.

Next, the glass panel unit 10 and the transparent plate 20 are bonded together with the intermediate film 30 (see FIG. 2A). More specifically, the outer surface 11, 12 of at least one of the first glass panel 1 or the second glass panel 2 of the glass panel unit 10 and the transparent plate 20 are bonded together with the intermediate film 30. In this embodiment, the outer surface 11 of the first glass panel 1 and the transparent plate 20 are bonded together with the intermediate film 30 made of a sheet of resin as shown in FIG. 2A. In this manner, the multi-layer stack 100 shown in FIG. 1A is obtained.

When the glass panel unit 10 and the transparent plate 20 are bonded together, a multi-layer stack, in which the glass panel unit 10 and the transparent plate 20 are stacked one on top of the other with the intermediate film 30 as a sheet of resin interposed between themselves, may be put into a vacuum bag larger in size than the multi-layer stack, for example. Then, the glass panel unit 10 and the transparent plate 20 are bonded together by heating the multi-layer stack to a predetermined temperature with a negative pressure produced by a vacuum pump connected to the vacuum bag. The predetermined temperature may be 140° C., for example. Note that the predetermined temperature varies depending on the softening temperature of the intermediate film 30 to use. Thus, the temperature needs to be adjusted to the properties of the intermediate film 30 to use but normally suitably falls within the range from 135° C. to 140° C. Note that the predetermined temperature is not limited to any particular temperature. For example, if a material that softens at a low temperature is used as a material for the intermediate film 30, then the predetermined temperature may be set at a temperature falling within the range from 80° C. to 110° C.

If the pressure applied for bonding the glass panel unit 10 and the transparent plate 20 together were too high, then the plurality of resin spacers 4 included in the glass panel unit 10 would collapse under the excessive pressure. In that case, this would cause damage to the glass panel unit 10 or cause a decline in the thermal insulation properties, the mechanical strength, or other properties of the glass panel unit 10. In this respect, in the manufacturing method according to this embodiment, the pressure applied for bonding the glass panel unit 10 and the transparent plate 20 together is approximately as high as the pressure for evacuating the vacuum bag with a vacuum pump, e.g., approximately 0.1 MPa or less, which is less than the compressive strength of the plurality of spacers 4. This reduces the chances of the plurality of spacers 4 collapsing under the excessive pressure. As used herein, the "pressure applied for bonding the glass panel unit 10 and the transparent plate 20 together" refers to the pressure applied to the glass panel unit 10 and the transparent plate 20 when the glass panel unit 10 and the transparent plate 20 are bonded together.

In this embodiment, the pressure applied for bonding the glass panel unit 10 and the transparent plate 20 together is suitably equal to or lower than 3 atmosphere [atm] ($\approx 0.3$ MPa), and more suitably equal to or lower than 1 atm ($\approx 0.1$ MPa). Thus, the glass panel unit 10 and the transparent plate 20 are bonded together with a pressure approximately as high as the pressure for evacuating the vacuum bag with a vacuum pump without applying further pressure to the vacuum bag with a press machine, for example. The lower limit value of the pressure applied for bonding is not limited to any particular value as long as the glass panel unit 10 and the transparent plate 20 may be bonded together, but is suitably equal to or greater than 0.2 atm ($\approx 0.02$ MPa) and more suitably equal to or greater than 0.3 atm ($\approx 0.03$ MPa). This may further reduce the chances of the plurality of resin spacers 4 collapsing under the excessive pressure, particularly when the spacers 4 are made of a polyimide resin. That is to say, the pressure applied for bonding suitably falls within the range from 0.2 atm to 3 atm and more suitably falls within the range from 0.2 atm to 1 atm.

In general, to bond the glass panel unit 10 and the transparent plate 20 together with the intermediate film 30 of the PVB resin, heat and pressure need to be applied with an autoclave machine used. The pressure applied is usually 13 atm ($\approx 1.3$ MPa), for example. Depending on the condition for applying heat and pressure, however, the spacers 4 included in the glass panel unit 10 would be deformed or the first glass panel 1, the second glass panel 2, or other members of the glass panel unit 10 would be damaged or deformed, for example. In contrast, the PVB resin may bond the glass panel unit 10 and the transparent plate 20 only by heating, without using any autoclave machine, by reducing the moisture content thereof. This allows the glass panel unit 10 and the transparent plate 20 to be bonded together only by heating by drying the intermediate film 30 of the PVB resin and then bonding the glass panel unit 10 and the transparent plate 20 with the intermediate film 30. According to an exemplary method for drying the intermediate film 30, a vacuum pump may be connected to a large chamber in which a desiccant such as a silica gel is put, only the intermediate film 30 may be loaded, as either a roll or a flat film, into the large chamber, and then the large chamber may be evacuated with the vacuum pump to maintain a predetermined degree of vacuum. According to this method, the intermediate film 30 may be dried and may have its moisture content decreased. The dried intermediate film 30 made of the PVB resin is heated while being sandwiched between the glass panel unit 10 and the transparent plate 20. In this manner, the glass panel unit 10 and the transparent plate 20 are bonded together with the intermediate film 30.

According to another method for bonding the glass panel unit 10 and the transparent plate 20, the intermediate film 30 made of the PVB resin is placed, for example, in a low-humidity environment (e.g., in a large chamber in which a desiccant such as a silica gel is put and to which a vacuum pump is connected) while being sandwiched between the glass panel unit 10 and the transparent plate 20, and then the low-humidity environment is evacuated with the vacuum pump to maintain a predetermined degree of vacuum. According to this method, the intermediate film 30 may be dried and may have its moisture content decreased.

The condition for drying the intermediate film 30 by itself or the intermediate film 30 sandwiched between the glass panel unit 10 and the transparent plate 20 may be set appropriately depending on the dimensions, the thickness, or any other parameter of the intermediate film 30. For example, the intermediate film 30 is suitably dried for at least 12 hours (suitably 48 hours or more) with the pressure in the large chamber reduced to 0.1 atm ($\simeq$0.01 MPa) or less.

To accelerate drying the intermediate film 30 sandwiched between the glass panel unit 10 and the transparent plate 20, a space is suitably provided between the transparent plate 20 (or the glass panel unit 10) and a base on which the transparent plate 20 is mounted. In that case, plate-shaped spacers are suitably provided, for example, at the four corners of the transparent plate 20 (or the glass panel unit 10). In addition, the thickness of these spacers is suitably equal to or greater than the thickness of the intermediate film 30, for example. That is to say, the space between the transparent plate 20 (or the glass panel unit 10) and the mount base is suitably at least as thick as the intermediate film 30.

In this embodiment, before the glass panel unit 10 and the transparent plate 20 are bonded together, the intermediate film 30 is dried to a moisture content falling within the range from 0.1% by weight to 0.5% by weight and is suitably dried to a moisture content falling within the range from 0.15% by weight to 0.3% by weight. The glass panel unit 10 and the transparent plate 20 may be bonded together only by heating, without using any autoclave machine, by drying the intermediate film 30 and thereby decreasing its moisture content as described above. Thus, decreasing the moisture content of the intermediate film 30 to the range from 0.1% by weight to 0.5% by weight allows bonding the glass panel unit 10 and the transparent plate 20 together with the intermediate film 30 of the PVB resin while reducing the deformation of the spacers 4 and the damage and deformation of the first glass panel 1 and the second glass panel 2.

Also, in a situation where the intermediate film 30 is made of the PVB resin, if the moisture content of the intermediate film 30 is less than 0.1% by weight, then the bond strength would be so high as to cause a decline in the anti-penetration ability of the film. On the other hand, if the moisture content of the intermediate film 30 is greater than 0.5% by weight, then the intermediate film 30 bonded would lose its transparency or produce bubbles therein. Furthermore, decreasing the moisture content of the intermediate film 30 made of the PVB resin sheet to the range from 0.1% by weight to 0.5% by weight, suitably to the range from 0.15% by weight to 0.3% by weight, may reduce the chances of causing a decline in the anti-penetration ability of the intermediate film 30, loss of its transparency, and/or production of bubbles therein.

Figure 2B:
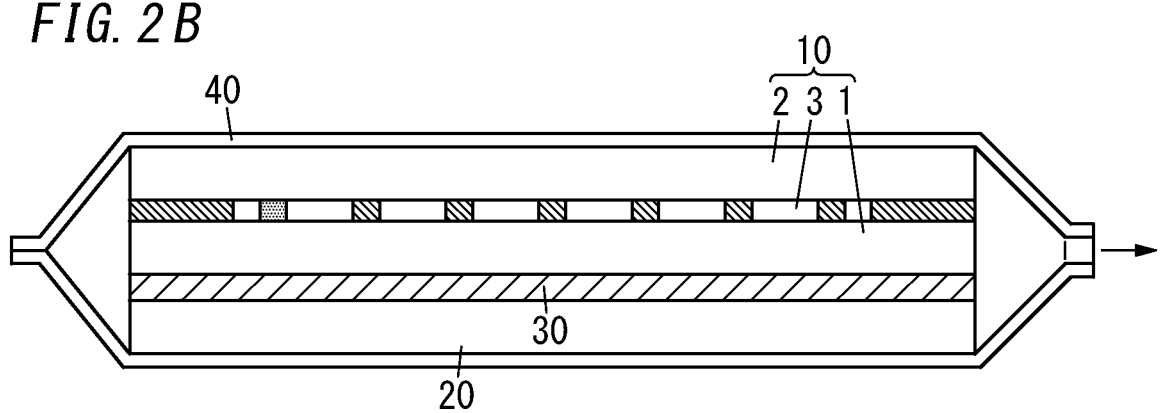

In addition, applying non-uniform pressure to the intermediate film 30 while bonding the glass panel unit 10 and the transparent plate 20 together with the intermediate film 30 made of the PVB resin is another cause of the loss of transparency of the intermediate film 30 and/or the production of bubbles therein. Thus, when bonded together, the glass panel unit 10 and the transparent plate 20 are suitably pressed so that pressure is applied uniformly to the intermediate film 30. For example, in this embodiment, the glass panel unit 10, the intermediate film 30, and the transparent plate 20 are put into a bag 40 such as a vacuum bag as shown in FIG. 2B, and the glass panel unit 10 and the transparent plate 20 are suitably bonded together with the intermediate film 30 while the bag 40 is being evacuated. That is to say, the glass panel unit 10 and the transparent plate 20 are suitably bonded together by a vacuum bag method. In this case, the glass panel unit 10 and the transparent plate 20 may be pressed against each other by evacuating the vacuum bag 40. This facilitates applying pressure uniformly to the intermediate film 30 and decreasing the humidity in the bag 40. Consequently, this reduces the chances of causing the loss of transparency of the intermediate film 30 and the production of bubbles therein. Note that the intermediate film 30 is suitably dried before being put into the bag 40. Alternatively, the intermediate film 30 may also be dried after having been put into the bag 40.

Figure 3:
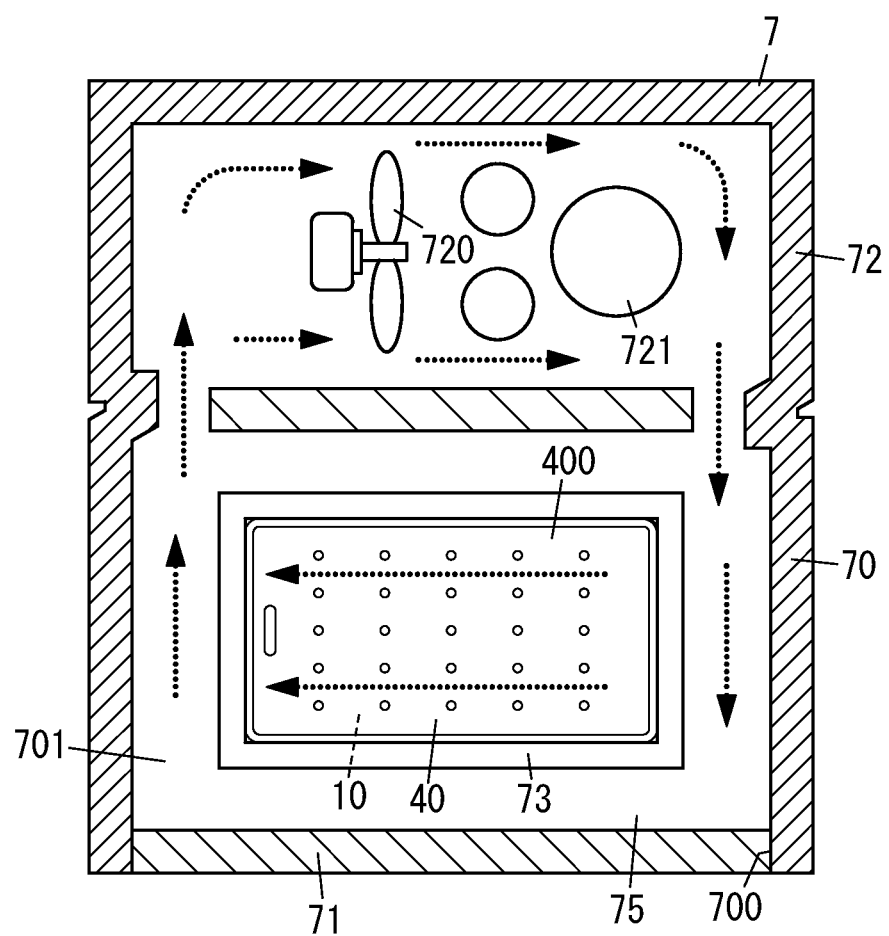
FIG. 3 is a horizontal cross-sectional view of a furnace for use in the method for manufacturing the multi-layer stack.

The bag 40 in which the glass panel unit 10, the intermediate film 30, and the transparent plate 20 are put may be heated, for example, by the furnace 7 shown in FIG. 3. In the following description, the bag 40 in which the glass panel unit 10, the intermediate film 30, and the transparent plate 20 are put will be hereinafter referred to as a "target 400."

The furnace 7 may be a hot air dryer and includes a heating chamber 70, a door 71, a hot air circulator 72, and a base 73. An opening 700 is provided in front of the heating chamber 70. Inside the furnace 7, a heating space 701 is created in the heating chamber 70. The heating space 701 is opened forward through the opening 700. The target 400 mounted on the base 73 may be loaded and unloaded, along with the base 73, for example, into/out of the heating space 701 through the opening 700. The door 71 is used to expose and shut the opening 700.

The hot air circulator 72 includes a blower 720 and a heater 721. The blower 720 is used to circulate the air in the heating space 701. The heater 721 is used to heat the gas circulated by the blower 720. The heater 721 may be a heat exchanger, for example. The hot air circulator 72 circulates the hot air to cause the hot air to flow in one direction substantially parallel to the rightward/leftward direction in the heating space 701 as shown in FIG. 3. The arrows shown in FIG. 3 indicate the direction in which the hot air flows.

In the furnace 7 (i.e., in the heating space 701), the base 73 is installed. The base 73 has a flat upper surface on which the target 400 is mounted.

Figure 4:
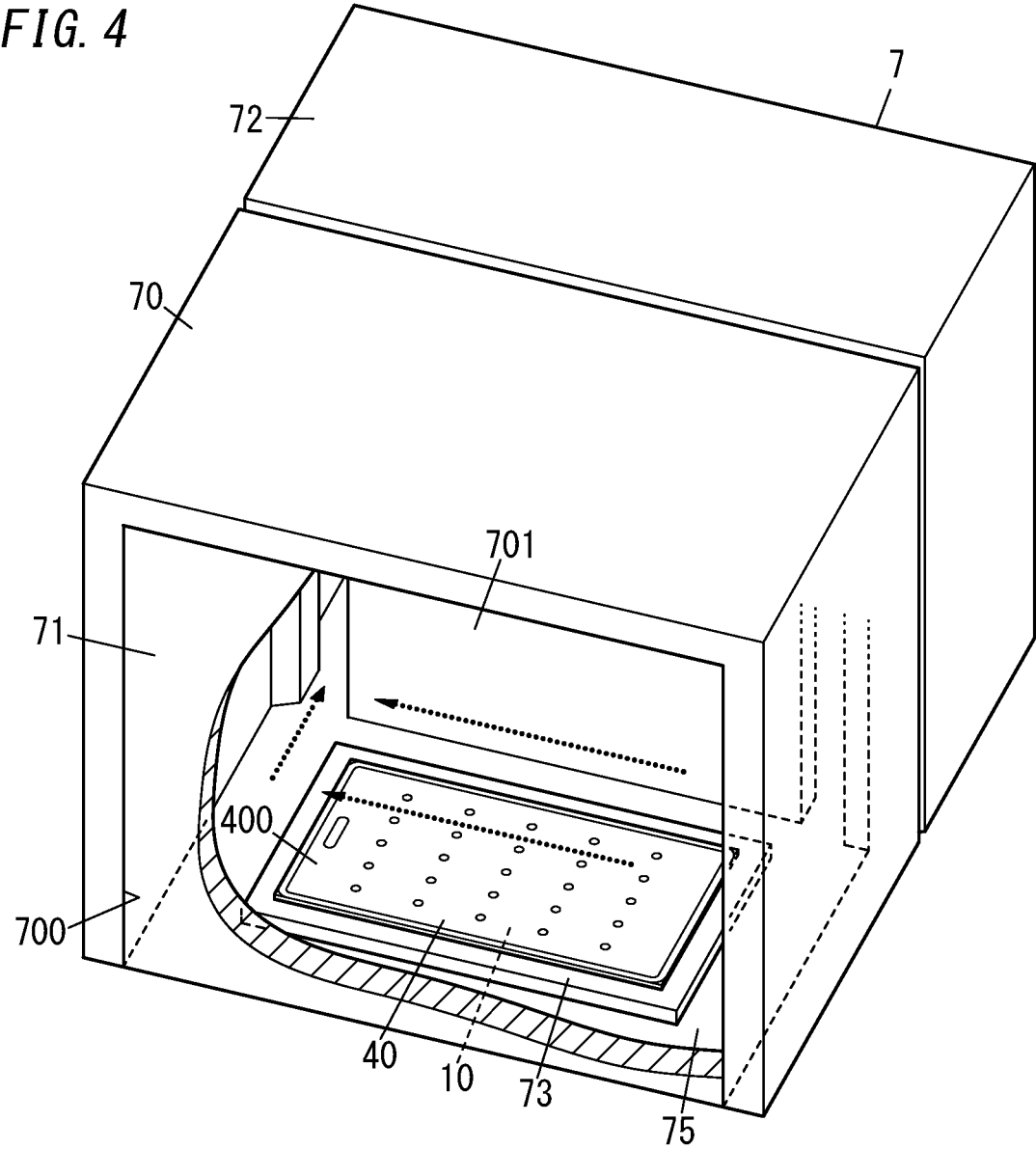
FIG. 4 is a perspective view illustrating how to dry a target placed in a flat position according to the method for manufacturing the multi-layer stack.

FIG. 4 illustrates an example in which the glass panel unit 10 is heated with the target 400 placed in a flat position on the base 73 installed in the heating space 701 (i.e., in the furnace 7). The glass panel unit 10 has excellent thermal insulation properties. Thus, if the target 400, in which the transparent plate 20 is laid on top of the glass panel unit 10 with the intermediate film 30 interposed between them (see FIG. 1) inside the bag 40, for example, is mounted on the upper surface of the base 73, then heat will not be transferred smoothly from the base 73 to the intermediate film 30. On the other hand, if the target 400, in which the glass panel unit 10 is laid on top of the transparent plate 20 with the intermediate film 30 interposed between themselves in the bag 40, is mounted on the upper surface of the base 73, then heat will not be transferred smoothly from the hot air, passing over the target 400, to the intermediate film 30. Unless heat is transferred uniformly to the intermediate film 30, the glass panel unit 10 and the transparent plate 20 may fail to be bonded together uniformly, or there will be a significant difference in temperature between the first glass panel 1 and the second glass panel 2 of the glass panel unit 10, thus possibly increasing the warpage of the glass panel unit 10 to the point of breaking either the first glass panel 1 or the second glass panel 2. For these reasons, heat is suitably transferred uniformly to the intermediate film 30.

Therefore, if the target 400 placed in a flat position on the base 73 as described above is heated inside the furnace 7, then a space is suitably provided, for example, between the target 400 and the base 73 on which the target 400 is mounted. Such a space may be left by, for example, placing the target 400 on the base 73 with a plurality of spacers interposed between the target 400 and the base 73. This allows the target 400 to be heated not only from over, but also from under, the bag 40. That is to say, this enables heating the bag 40 from both sides more easily, thus facilitating heating the intermediate film 30 uniformly.

Figure 5:
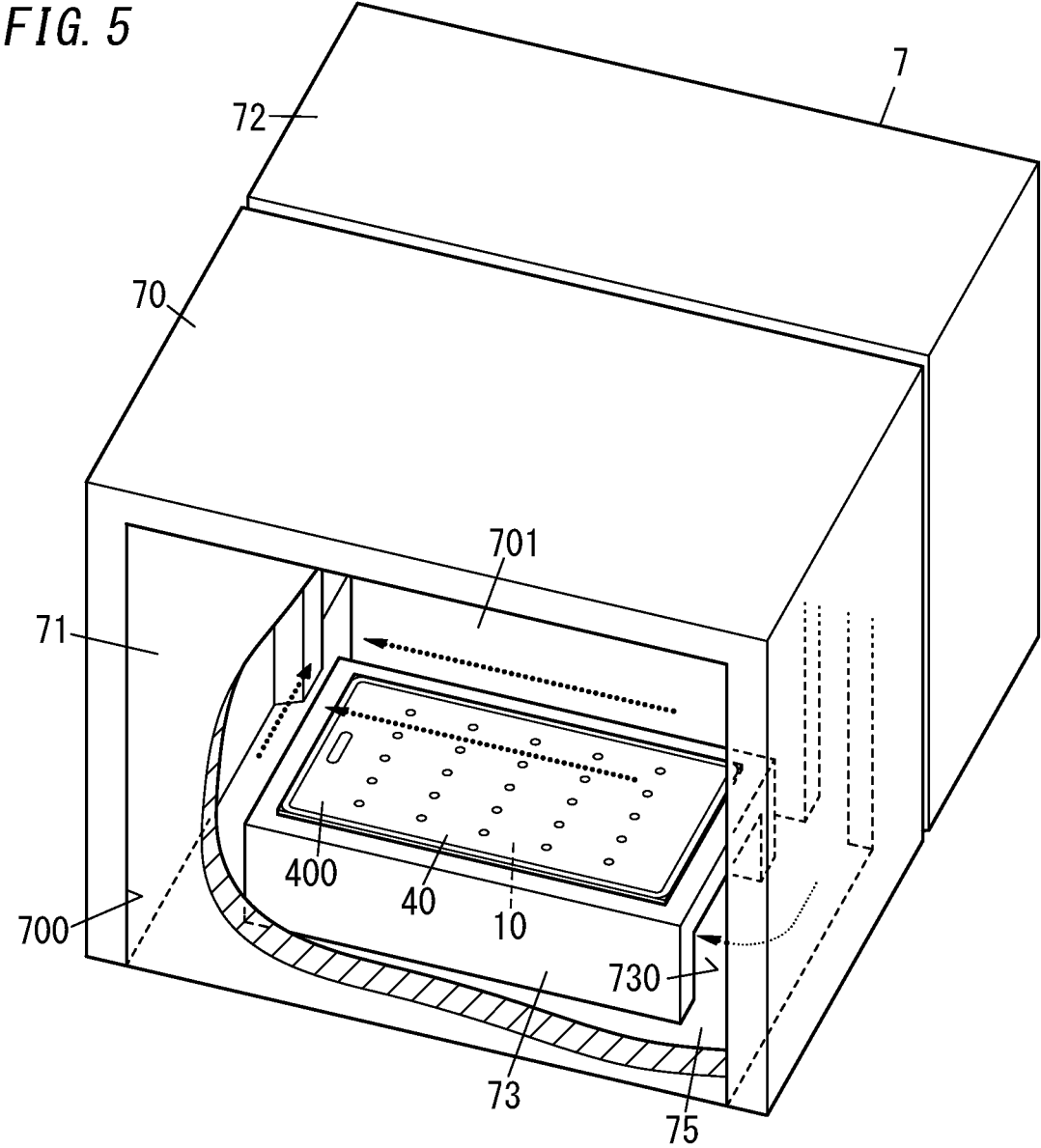
FIG. 5 is a perspective view illustrating how to heat the target in a different manner from in FIG. 4 according to the method for manufacturing the multi-layer stack.

In addition, as shown in FIG. 5, a ventilation space 730 allowing gases to pass therethrough is suitably provided for the base 73. In the example shown in FIG. 5, the lower surface of the base 73 is provided with a groove that extends along the entire length of the base 73 in the rightward/leftward direction and the space inside this groove serves as the ventilation space 730. Letting the hot air (i.e., a gas in the furnace 7) pass through such a ventilation space 730 raises the temperature of the base 73 and allows the bag 40 placed in a flat position on the base 73 to be heated. This may eliminate, or minimize to say the least, the difference in temperature between the first glass panel 1 and the second glass panel 2 of the glass panel unit 10. This facilitates heating the intermediate film 30 uniformly. Note that although the ventilation space 730 shown in FIG. 5 is provided between the base 73 and an installation surface 75 on which the base 73 is installed, the ventilation space 730 may also be created inside the base 73.

If the ventilation space 730 is created in the base 73 as shown in FIG. 5, the material for the base 73 is suitably a material having better thermal conductivity than the bag 40 such as aluminum. Also, in that case, the thickness of the base 73 (made of aluminum) is suitably equal to or greater than 5 mm. Optionally, a raised portion having such a shape as to collect heat such as a heat sink may be provided for a portion, exposed to the hot air, of the base 73 (which is made of a material with good thermal conductivity). Examples of materials with good thermal conductivity include not only aluminum but also metals such as copper and brass, thermally conductive ceramics such as alumina or graphite, a multi-layer stack including a composite of these materials.

Figure 6:
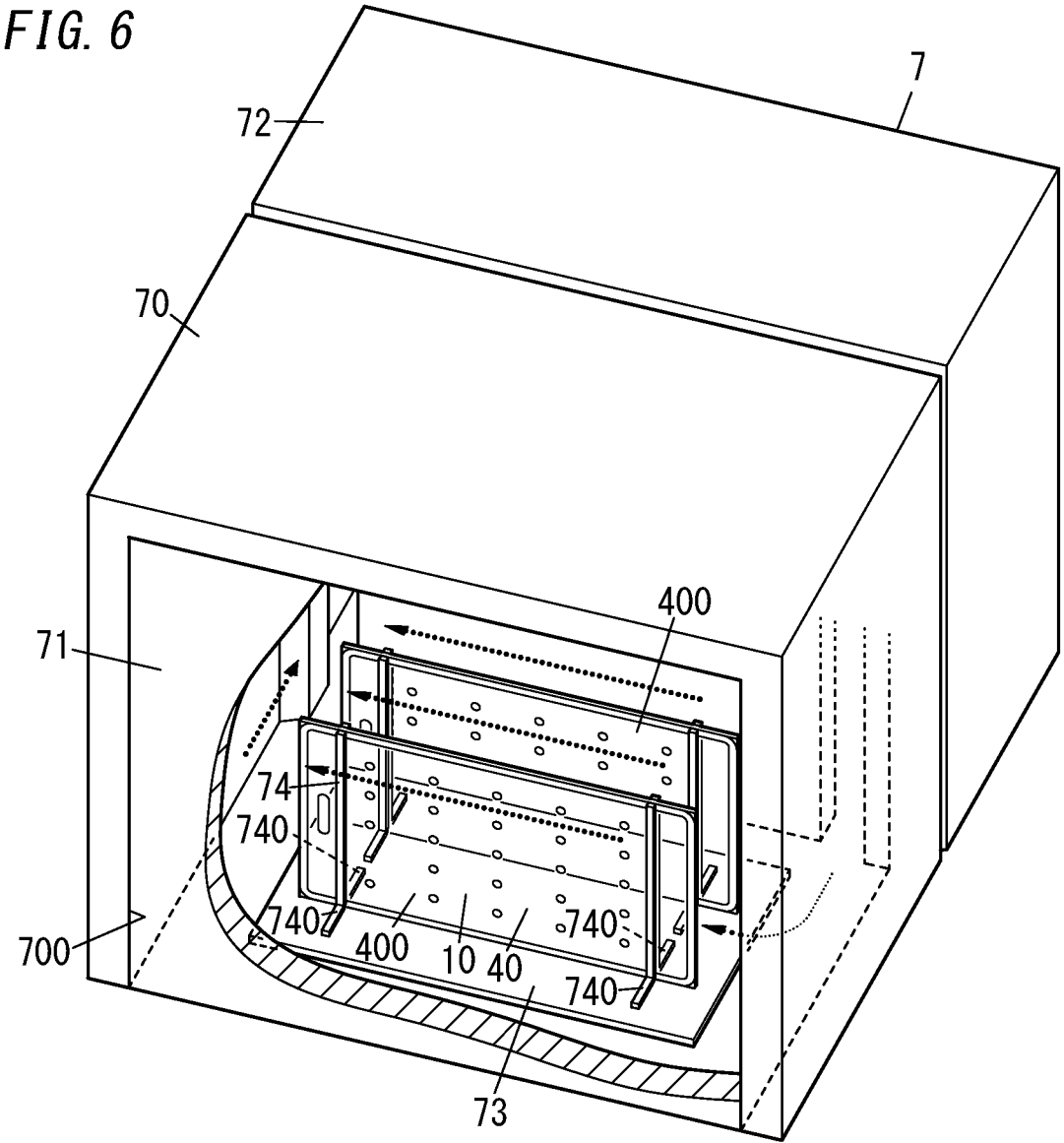
FIG. 6 is a perspective view illustrating how to dry the target placed in an upright position according to the method for manufacturing the multi-layer stack.

Alternatively, the target 400 is also suitably heated in an upright position as shown in FIG. 6. In that case, the target 400 may be mounted, for example, on the base 73 such that the glass panel unit 10, the intermediate film 30, and the transparent plate 20 are arranged in this order in the forward/backward direction and the thickness of each of the glass panel unit 10, the intermediate film 30, and the transparent plate 20 is substantially parallel to the forward/backward direction. This also allows the target 400 to be heated more easily from both sides thereof (i.e., from both sides of the bag 40), thus facilitating heating the intermediate film 30 uniformly.

Optionally, if the target 400 is heated in the upright position, then the target 400 may be supported by, for example, a supporter 74 shown in FIG. 6. The supporter 74 includes a plurality of supporting members 740, supporting only right and left end portions of the target 400. Using such a supporter 74 allows holding the target 400 in the upright position while reducing the chances of applying force to the glass panel unit 10 and the transparent plate 20 that are put in the bag 40.

In general, when the intermediate film 30 made of an EVA resin is used, then the glass panel unit 10 and the transparent plate 20 may be bonded together even at a lower heating temperature than the PVB resin. Thus, bonding the glass panel unit 10 and the transparent plate 20 together with the intermediate film 30 made of the EVA resin may reduce the chances of causing deformation of the spacers 4 included in the glass panel unit 10 and deformation, damage, and other inconveniences of the first glass panel 1 and second glass panel 2 thereof. Furthermore, even when the intermediate film 30 made of the EVA resin is used, the glass panel unit 10, the intermediate film 30, and the transparent plate 20 are also suitably put in the bag 40 and the glass panel unit 10 and the transparent plate 20 are suitably bonded together with the intermediate film 30 with the bag 40 evacuated. That is to say, the glass panel unit 10 and the transparent plate 20 are suitably bonded together by the vacuum bag method. This facilitates applying pressure uniformly to the intermediate film 30, thus allowing a multi-layer stack 100 with a uniform thickness to be obtained more easily.

Note that in the method for manufacturing a multi-layer stack 100 according to this embodiment, the glass panel unit 10 and the transparent plate 20 do not have to be bonded by the vacuum bag method but may also be bonded by any other known bonding method.

For example, if the intermediate film 30 is made of a thermosetting resin, then the glass panel unit 10 and the transparent plate 20 may be heated with the intermediate film 30 made of the thermosetting resin interposed between the glass panel unit 10 and the transparent plate 20.

Alternatively, if the intermediate film 30 is made of a UV curable resin, for example, then the intermediate film 30 made of the UV curable resin may be irradiated with an ultraviolet ray while being interposed between the glass panel unit 10 and the transparent plate 20.

Optionally, after the glass panel unit 10 and the transparent plate 20 have been bonded together, the assembly may be subjected to autoclave curing at a low temperature.

1-2-3. Use of Multi-Layer Stack

The multi-layer stack 100 according to the first embodiment may be used in any field without limitation but is applicable to, for example, a field that requires high mechanical strength and excellent thermal insulation properties. Examples of uses of the multi-layer stack 100 include various types of moving vehicles such as automobiles, railway trains, watercrafts, spacecrafts, and space stations. For example, when applied to an automobile, the multi-layer stack 100 may be used in its front windshield, side windows, and rear windshield, for example.

2. Second Embodiment

2-1. Overview of Second Embodiment

Figure 7:
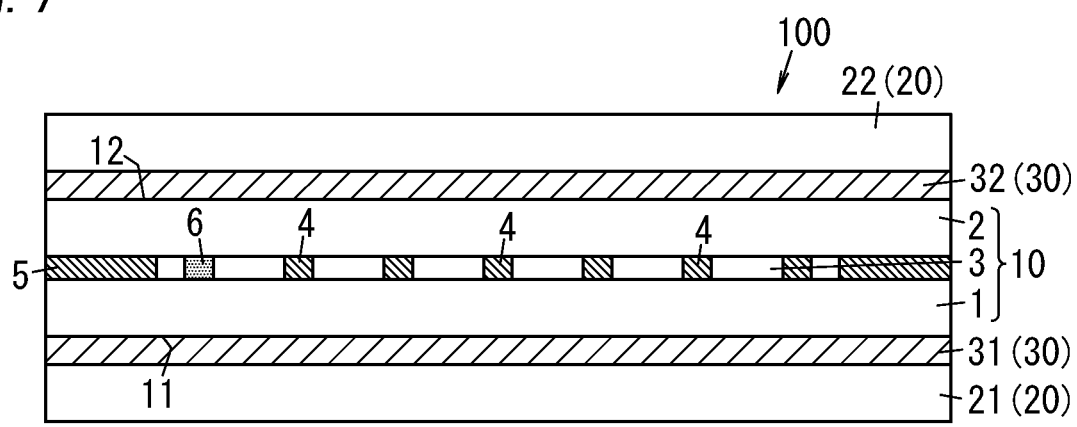
FIG. 7 is a schematic cross-sectional view illustrating an exemplary multi-layer stack according to a second embodiment.

A multi-layer stack 100 according to a second embodiment of the present disclosure includes the glass panel unit 10, a first transparent plate 21, a first intermediate film 31, a second transparent plate 22, and a second intermediate film 32 (see FIG. 7). The glass panel unit 10 includes: the first glass panel 1; the second glass panel 2; and the evacuated space 3 provided between the first glass panel 1 and the second glass panel 2. The plurality of resin spacers 4 are provided in the evacuated space 3 between the first glass panel 1 and the second glass panel 2. The first transparent plate 21 is provided for the outer surface 11 of the first glass panel 1 of the glass panel unit 10. The first intermediate film 31 is interposed between the first glass panel 1 and the first transparent plate 21. That is to say, the first transparent plate 21 is provided along the outer surface 11 of the first glass panel 1 and the first intermediate film 31 is interposed between the first glass panel 1 and the first transparent plate 21.

The second transparent plate 22 is provided for the outer surface 12 of the second glass panel 2 of the glass panel unit 10. The second intermediate film 32 is interposed between the second glass panel 2 and the second transparent plate 22. That is to say, the second transparent plate 22 is provided along the outer surface 12 of the second glass panel 2 and the second intermediate film 32 is interposed between the second glass panel 2 and the second transparent plate 22.

In the multi-layer stack 100 according to this embodiment, the first transparent plate 21 and the second transparent plate 22 are respectively provided for the outer surface 11 of the first glass panel 1 of the glass panel unit 10 and the outer surface 12 of the second glass panel 2 of the glass panel unit 10. This allows the multi-layer stack 100 to have improved mechanical strength, thermal insulation properties, and sound insulation compared to the glass panel unit 10 without any of these transparent plates 21, 22. In addition, this also makes the mechanical strength, thermal insulation properties, and sound insulation of this multi-layer stack 100 superior to those of the multi-layer stack 100 in which the transparent plate 20 is provided for only either the outer surface 11 of the first glass panel 1 or the outer surface 12 of the second glass panel 2.

Figure 8A:
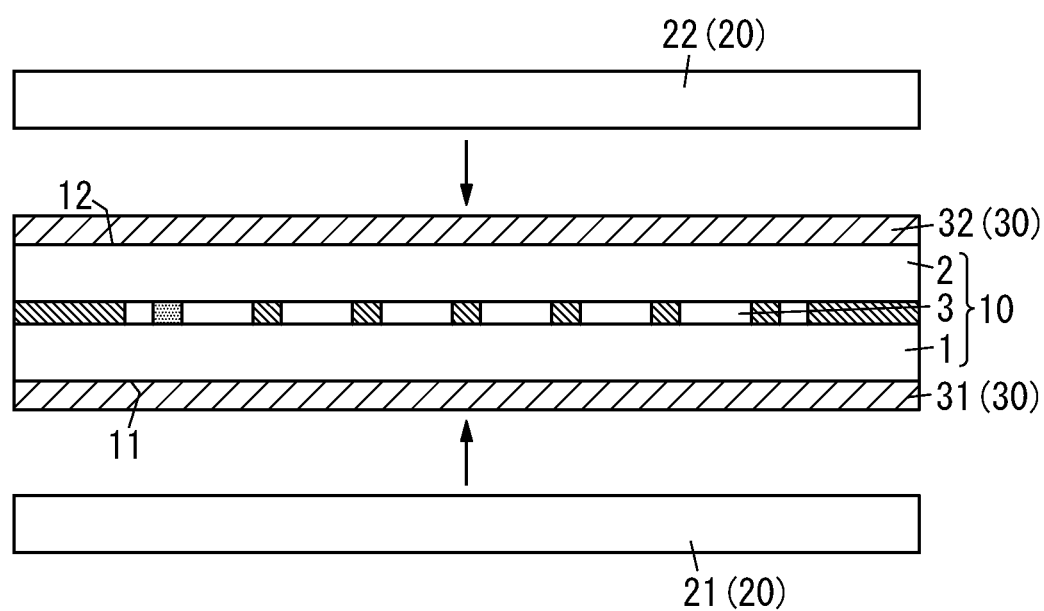
FIGS. 8A and 8B are schematic cross-sectional views illustrating an exemplary method for manufacturing the multi-layer stack according to the second embodiment.

To manufacture the multi-layer stack 100 according to this embodiment, the outer surface 11 of the first glass panel 1 of the glass panel unit 10 and the first transparent plate 21 are bonded together with the first intermediate film 31 interposed between themselves (see FIG. 8A). In addition, the outer surface 12 of the second glass panel 2 of the glass panel unit 10 and the second transparent plate 22 are bonded together with the second intermediate film 32 interposed between themselves (see FIG. 8A). In this manner, a multi-layer stack 100 with excellent mechanical strength, thermal insulation properties, and sound insulation may be obtained.

2-2. Details of Second Embodiment

Next, the multi-layer stack 100 according to the second embodiment and a method for manufacturing the same will be described in detail.

2-2-1. Multi-Layer Stack

The multi-layer stack 100 according to this embodiment also includes the glass panel unit 10, the transparent plate 20, and the intermediate film 30. In the multi-layer stack 100 according to this embodiment, the transparent plate 20 includes the first transparent plate 21 and the second transparent plate 22 described above, and the intermediate film 30 includes the first intermediate film 31 and the second intermediate film 32 described above. These constituent elements will be described in detail. In the following description, any constituent element of the multi-layer stack 100 according to this second embodiment, having the same function as a counterpart of the multi-layer stack 100 according to the first embodiment described above, will be designated by the same reference numeral as that counterpart's, and description thereof will be sometimes omitted herein.

(1) Glass Panel Unit

The glass panel unit 10 according to this embodiment has the same configuration as the glass panel unit 10 according to the first embodiment. Thus, the glass panel unit 10 includes: the first glass panel 1; the second glass panel 2; and the evacuated space 3 provided between the first glass panel 1 and the second glass panel 2. In addition, in the evacuated space 3, the plurality of spacers 4 made of resin are provided between the first glass panel 1 and the second glass panel 2.

(2) Transparent Plate

The transparent plate 20 according to this embodiment includes the first transparent plate 21 and the second transparent plate 22 as described above.

(i) First Transparent Plate

The first transparent plate 21, as well as the transparent plate 20 according to the first embodiment, is also a plate member having light-transmitting properties. The material for the first transparent plate 21 may also be the same as the material for the transparent plate 20 according to the first embodiment.

In the multi-layer stack 100 according to this embodiment, the first transparent plate 21 is provided for the outer surface 11 of the first glass panel 1 of the glass panel unit 10. Thus, the first transparent plate 21 also faces the glass panel unit 10. In addition, the first transparent plate 21 also faces the first glass panel 1.

(ii) Second Transparent Plate

The second transparent plate 22 is a plate member having the same light-transmitting properties as the transparent plate 20 according to the first embodiment. The material for the second transparent plate 22 may also be the same as the material for the transparent plate 20 according to the first embodiment. In this embodiment, the material for the first transparent plate 21 and the material for the second transparent plate 22 may be either the same as each other or different from each other, whichever is appropriate.

For example, the first transparent plate 21 and the second transparent plate 22 may be both made of polycarbonate. Alternatively, the first transparent plate 21 and the second transparent plate 22 may be both made of glass, for example. Still alternatively, one of the first transparent plate 21 or the second transparent plate 22 may be made of polycarbonate and the other may be made of glass.

That is to say, at least one of the first transparent plate 21 or the second transparent plate 22 suitably includes a glass pane. In addition, at least one of the first transparent plate 21 or the second transparent plate 22 suitably includes a polycarbonate plate.

In the multi-layer stack 100 according to this embodiment, the second transparent plate 22 is provided for the outer surface 12 of the second glass panel 2 of the glass panel unit 10. Thus, the second transparent plate 22 faces the glass panel unit 10. In addition, the second transparent plate 22 also faces the second glass panel 2.

(3) Intermediate Film

The intermediate film 30 according to this embodiment includes the first intermediate film 31 and the second intermediate film 32 as described above.

(i) First Intermediate Film

The first intermediate film 31 may have the same configuration as the intermediate film 30 according to the first embodiment. In the multi-layer stack 100 according to this embodiment, the first intermediate film 31 is interposed between the outer surface 11 of the first glass panel 1 of the glass panel unit 10 and the first transparent plate 21. Thus, the first intermediate film 31 may be used to bond the glass panel unit 10 and the first transparent plate 21 together, and more specifically, bond the first glass panel 1 and the first transparent plate 21 together.

(ii) Second Intermediate Film

The second intermediate film 32 may have the same configuration as the intermediate film 30 according to the first embodiment. In the multi-layer stack 100 according to this embodiment, the second intermediate film 32 is interposed between the outer surface 12 of the second glass panel 2 of the glass panel unit 10 and the second transparent plate 22. Thus, the second intermediate film 32 may be used to bond the glass panel unit 10 and the second transparent plate 22 together, and more specifically, bond the second glass panel 2 and the second transparent plate 22 together.

(iii) Materials for First Intermediate Film and Second Intermediate Film

The first intermediate film 31 may have the same configuration as the intermediate film 30 according to the first embodiment as described above. Thus, the material for the first intermediate film 31 may be the same as the material for the intermediate film 30 according to the first embodiment.

Likewise, the second intermediate film 32 may have the same configuration as the intermediate film 30 according to the first embodiment as described above. Thus, the material for the second intermediate film 32 may also be the same as the material for the intermediate film 30 according to the first embodiment.

In the multi-layer stack 100 according to this embodiment, the first intermediate film 31 and the second intermediate film 32 are suitably made of different materials. This would enhance the performance of the multi-layer stack 100 while facilitating the manufacturing process thereof.

For example, at least one of the first intermediate film 31 or the second intermediate film 32 is suitably made of a polyvinyl butyral (PVB) resin. This would ensure sufficient mechanical strength for the multi-layer stack 100, to say the least. In addition, using a PVB resin of a grade that provides sound insulation, heat insulation, and UV cut properties would ensure sufficient mechanical strength and functionalities for the multi-layer stack 100. In addition, this would also increase the anti-penetration ability of the multi-layer stack 100.

In addition, at least one of the first intermediate film 31 or the second intermediate film 32 is suitably made of an ethylene vinyl acetate (EVA) copolymer resin. This would increase the anti-scattering ability of the multi-layer stack 100. In addition, using the EVA resin allows the glass panel unit 10 and the transparent plate 21, 22 to be bonded together at a relatively low temperature, thus facilitating the manufacturing process of the multi-layer stack 100 as well. This would also increase the handleability of the multi-layer stack 100.

Furthermore, at least one of the first intermediate film 31 or the second intermediate film 32 is suitably made of an ionomer resin. This would increase the anti-scattering ability, anti-penetration ability, and mechanical strength of the multi-layer stack 100. In addition, the ionomer resin allows the glass panel unit 10 and the transparent plate 21, 22 to be bonded together at the same temperature as the PVB resin, thus facilitating the manufacturing process of the multi-layer stack 100. This would also increase the mechanical strength of the overall multi-layer stack 100.

Furthermore, at least one of the first intermediate film 31 or the second intermediate film 32 is suitably made of a cycloolefin resin. This would increase the transparency, waterproofness, and bond strength of the multi-layer stack 100. In addition, the cycloolefin resin allows the glass panel unit 10 and the transparent plate 21, 22 to be bonded together at the same temperature as the PVB resin, thus facilitating the manufacturing process of the multi-layer stack 100.

Furthermore, in this embodiment, the first intermediate film 31 and the second intermediate film 32 are suitably made of different materials. In that case, each of the first intermediate film 31 and the second intermediate film 32 may be made of, for example, a resin selected from the group consisting of a polyvinyl butyral resin, an ethylene vinyl acetate copolymer resin, an ionomer resin, a cycloolefin resin, and a polyolefin resin. Making the first intermediate film 31 and the second intermediate film 32 of two different materials in this manner would allow the multi-layer stack 100 to achieve both the advantages of the material for the first intermediate film 31 and the advantages of the material for the second intermediate film 32 alike.

For example, it is recommended that the first intermediate film 31 be made of the PVB resin and the second intermediate film 32 be made of the EVA resin. Alternatively, it is also recommended that the first intermediate film 31 be made of the EVA resin and the second intermediate film 32 be made of the PVB resin. In each of these cases, the manufacturing process of the multi-layer stack 100 may be facilitated with sufficient mechanical strength ensured for the multi-layer stack 100. That is to say, the mechanical strength enhancement and simplified manufacturing process are achieved at the same time for the multi-layer stack 100. In addition, the multi-layer stack 100 with each of these configurations may also provide the anti-penetration ability and the anti-scattering ability at a time. For example, one of the first intermediate film 31 or the second intermediate film 32 which is required to have sufficient anti-penetration ability is suitably made of the PVB resin and the other intermediate film 31, 32 required to have anti-scattering ability is suitably made of the EVA resin. In addition, using a sound insulating PVB resin as the PVB resin would increase not only the anti-penetration ability and anti-scattering ability of the multi-layer stack 100 but also the sound insulation thereof as well. The sound insulating PVB resin is suitably used for windows of buildings and railway trains that are required to curtail noise as much as possible for noise-sensitive people and for windows of automobiles and other vehicles in the field of mobility.

Alternatively, in this embodiment, the first intermediate film 31 and the second intermediate film 32 may also be made of the same material. In that case, the advantages of the material for the first intermediate film 31 and the second intermediate film 32 would be achieved particularly significantly.

For example, the first intermediate film 31 and the second intermediate film 32 are suitably both made of the PVB resin. This would increase the mechanical strength of the multi-layer stack 100 particularly significantly. In addition, this would also increase the anti-penetration ability of the multi-layer stack 100 particularly significantly. Alternatively, the first intermediate film 31 and the second intermediate film 32 are also suitably both made of the EVA resin. This would facilitate the manufacturing process of the multi-layer stack 100 particularly significantly. In addition, this would also increase the anti-scattering ability of the multi-layer stack 100 particularly significantly.

2-2-2. Method for Manufacturing Multi-Layer Stack

The multi-layer stack 100 according to this embodiment may be manufactured by performing, for example, the following process steps. Note that the following method for manufacturing the multi-layer stack 100 is only an example and should not be construed as limiting.

First, the glass panel unit 10, the transparent plate 20, and the intermediate film 30 are provided. In the multi-layer stack 100 according to this embodiment, the transparent plate 20 includes the first transparent plate 21 and the second transparent plate 22, and the intermediate film 30 includes the first intermediate film 31 and the second intermediate film 32. Thus, the first transparent plate 21 and the second transparent plate 22 are provided as the transparent plate 20, and the first intermediate film 31 and the second intermediate film 32 are provided as the intermediate film 30.

Next, the glass panel unit 10 and the transparent plate 20 are bonded together with the intermediate film 30 (see FIG. 8A). In this embodiment, the outer surface 11 of the first glass panel 1 of the glass panel unit 10 and the first transparent plate 21 are bonded together with the first intermediate film 31 interposed between themselves. In addition, the outer surface 12 of the second glass panel 2 of the glass panel unit 10 and the second transparent plate 22 are bonded together with the second intermediate film 32 interposed between themselves. In each of the process step of bonding the glass panel unit 10 and the first transparent plate 21 together and the process step of bonding the glass panel unit 10 and the second transparent plate 22 together, the pressure applied for bonding is less than the compressive strength of the resin spacers 4 included in the glass panel unit 10. This reduces the chances of the plurality of resin spacers 4 included in the glass panel unit 10 collapsing under the pressure.

Bonding the glass panel unit 10 and the first transparent plate 21 and bonding the glass panel unit 10 and the second transparent plate 22 may be performed either separately from each other or simultaneously, whichever is appropriate.

For example, if the first intermediate film 31 and the second intermediate film 32 are made of the same material, then bonding the glass panel unit 10 and the first transparent plate 21 and bonding the glass panel unit 10 and the second transparent plate 22 are suitably performed simultaneously. This allows manufacturing the multi-layer stack 100 efficiently. For example, the first intermediate film 31 and the second intermediate film 32 are suitably both made of a polyvinyl butyral (PVB) resin. In that case, the glass panel unit 10, the first transparent plate 21, and the second transparent plate 22 are suitably bonded together at a relative humidity of 10% or less. This allows bonding the glass panel unit 10 and the first transparent plate 21 together only by heating and bonding the glass panel unit 10 and the second transparent plate 22 together only by heating. This may also reduce the chances of the first intermediate film 31 and the second intermediate film 32 made of the PVB resin losing transparency or producing bubbles therein. Alternatively, both the first intermediate film 31 and the second intermediate film 32 are suitably made of, for example, an ethylene vinyl acetate (EVA) copolymer resin. Still alternatively, the first intermediate film 31 and the second intermediate film 32 may be both made of a thermosetting resin or both made of a UV curable resin.

Particularly when the first intermediate film 31 and the second intermediate film 32 are both made of the PVB resin, the glass panel unit 10 and the transparent plate 20 are laid one on top of the other with the intermediate film 30 as a sheet of resin interposed between themselves, and the multi-layer stack is loaded into a vacuum chamber. Then, a negative pressure is produced in the vacuum chamber by a vacuum pump connected to the vacuum chamber to dry the intermediate film 30. This allows decreasing the moisture content of the intermediate film 30. Specifically, the intermediate film 30 is suitably dried to a moisture content equal to or less than 0.5% by weight. The glass panel unit 10 and the transparent plates 21, 22 may be bonded together only by heating with the first intermediate film 31 and the second intermediate film 32 by decreasing their moisture content as described above. This reduces the chances of the intermediate film 30 losing its transparency and/or producing voids therein while reducing the deformation of the spacers 4 included in the glass panel unit 10 and the damage and deformation of the first glass panel 1 and the second glass panel 2.

Figure 8B:
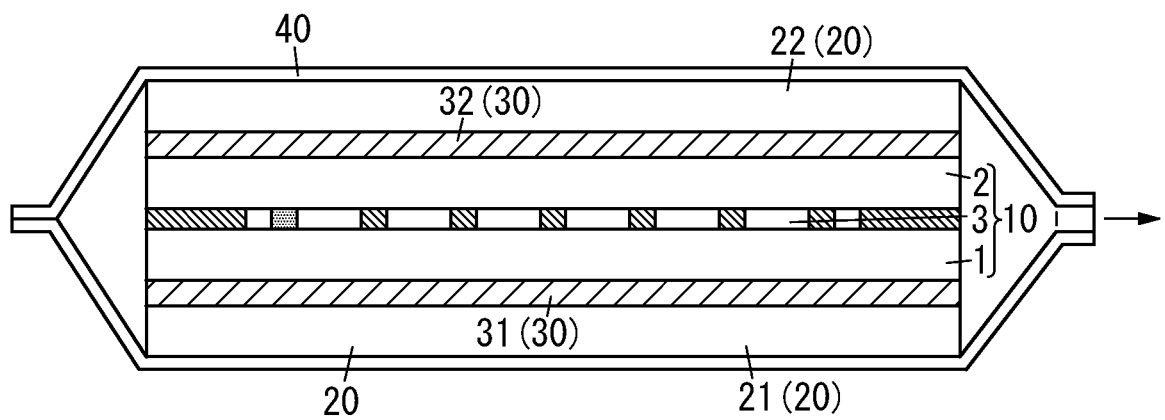

In this embodiment, as in the method for manufacturing the multi-layer stack 100 according to the first embodiment, the glass panel unit 10, the intermediate film 30, and the transparent plate 20 are suitably put into a bag 40, and the glass panel unit 10 and the transparent plate 20 are suitably bonded together with the intermediate film 30 while the bag 40 is being evacuated. Specifically, as shown in FIG. 8B, the glass panel unit 10, the first intermediate film 31, the first transparent plate 21, the second intermediate film 32, and the second transparent plate 22 are arranged in the bag 40. Then, with the bag 40 evacuated, the glass panel unit 10 and the first transparent plate 21 are suitably bonded together with the first intermediate film 31 while the glass panel unit 10 and the second transparent plate 22 are suitably bonded together with the second intermediate film 32. That is to say, the glass panel unit 10, the first transparent plate 21, and the second transparent plate 22 are suitably bonded together by a vacuum bag method. This facilitates applying pressure uniformly to the first intermediate film 31 and the second intermediate film 32 and decreasing the humidity in the bag 40. Consequently, this reduces the chances of causing the loss of transparency of the first intermediate film 31 and the second intermediate film 32 and/or the production of bubbles therein. Note that the first intermediate film 31 and the second intermediate film 32 are suitably dried before being put into the bag 40. Alternatively, the first intermediate film 31 and the second intermediate film 32 may also be dried after having been put into the bag 40.

In this embodiment, the bag 40 may also be heated by the furnace 7 as in the first embodiment described above. Particularly, in this second embodiment, if the bag 40 is placed in a flat position inside the furnace 7, either the first intermediate film 31 or the second intermediate film 32 may be interposed between the base 73 and the glass panel unit 10. Since the glass panel unit 10 has excellent thermal insulation properties, heat is less likely to be transferred to the intermediate film, located closer to the base, out of the first intermediate film 31 and the second intermediate film 32. Thus, in this embodiment, heat is suitably applied uniformly to both the first intermediate film 31 and the second intermediate film 32.

For example, a space is suitably provided between the bag 40 in which the glass panel unit 10, the first intermediate film 31, the first transparent plate 21, the second intermediate film 32, and the second transparent plate 22 are put and the base on which the bag 40 is mounted. This allows the bag 40 to be heated not only from over, but also from under, the bag 40. That is to say, this enables heating the bag 40 from both sides more easily, thus facilitating heating the first intermediate film 31 and the second intermediate film 32 uniformly. For example, as in the example shown in FIG. 5, the base 73 may be made of a material having better thermal conductivity than the bag 40 and the ventilation space 730 is created in the base 73. Alternatively, a raised portion having such a shape as to collect heat such as a heat sink is suitably provided for a portion, exposed to the hot air, of the base 73 (which is made of a material with good thermal conductivity). This also enables heating the bag 40 from both sides more easily, thus facilitating heating the first intermediate film 31 and the second intermediate film 32 uniformly. Still alternatively, the bag 40 in which the glass panel unit 10, the first intermediate film 31, the first transparent plate 21, the second intermediate film 32, and the second transparent plate 22 are put is also suitably heated in an upright position. This also allows the bag 40 to be heated more easily from both sides thereof, thus facilitating heating the first intermediate film 31 and the second intermediate film 32 uniformly.

Naturally, even if both the first intermediate film 31 and the second intermediate film 32 are made of an EVA resin, an ionomer resin, a cycloolefin resin, or a polyolefin resin, the glass panel unit 10, the first transparent plate 21, and the second transparent plate 22 may also be bonded together by the vacuum bag method.

For example, if the first intermediate film 31 and the second intermediate film 32 are made of different materials, then bonding the glass panel unit 10 and the first transparent plate 21 and bonding the glass panel unit 10 and the second transparent plate 22 are suitably performed separately from each other. The reason is as follows. Specifically, if the first intermediate film 31 and the second intermediate film 32 are made of different materials, then there may be a difference between the heating temperature required for bonding with the first intermediate film 31 and the heating temperature required for bonding with the second intermediate film 32. Thus, if the first intermediate film 31 and the second intermediate film 32 made of different materials are heated simultaneously, then the bond strength may be insufficient or the intermediate film 30 may be deformed. In this respect, bonding the glass panel unit 10 and the first intermediate film 31 separately from bonding the glass panel unit 10 and the second intermediate film 32 may reduce the chances of the bond strength becoming insufficient or the intermediate film 30 being deformed.

Specifically, one intermediate film, requiring the higher heating temperature for bonding, out of the first intermediate film 31 and the second intermediate film 32 is suitably bonded earlier than the other intermediate film. For example, if the heating temperature of the first intermediate film 31 is higher than the heating temperature of the second intermediate film 32, then the glass panel unit 10 and the second transparent plate 22 are suitably bonded together with the second intermediate film 32 after the glass panel unit 10 and the first transparent plate 21 have been bonded together with the first intermediate film 31. Alternatively, if the heating temperature of the second intermediate film 32 is higher than the heating temperature of the first intermediate film 31, then the glass panel unit 10 and the first transparent plate 21 are suitably bonded together with the first intermediate film 31 after the glass panel unit 10 and the second transparent plate 22 have been bonded together with the second intermediate film 32.

For example, if the first intermediate film 31 is made of the PVB resin and the second intermediate film 32 is made of the EVA resin, then the heating temperature required for bonding with the first intermediate film 31 made of the PVB resin may be higher than the heating temperature required for bonding with the second intermediate film 32 made of the EVA resin. In that case, the glass panel unit 10 and the second transparent plate 22 are suitably bonded together with the second intermediate film 32 made of the EVA resin after the glass panel unit 10 and the first transparent plate 21 have been bonded together with the first intermediate film 31 made of the PVB resin. In that case, bonding the glass panel unit 10 and the first transparent plate 21 with the first intermediate film 31 made of the PVB resin is suitably performed by the vacuum bag method. Meanwhile, bonding the glass panel unit 10 and the second transparent plate 22 with the second intermediate film 32 made of the EVA resin may or may not be performed by the vacuum bag method.

2-2-3. Use of Multi-Layer Stack

The multi-layer stack 100 according to the second embodiment may be used in any field without limitation but is applicable to, for example, a field that requires high mechanical strength and excellent thermal insulation properties. Examples of uses of the multi-layer stack 100 include various types of moving vehicles such as automobiles, railway trains, watercrafts, spacecrafts, and space stations. For example, when applied to an automobile, the multi-layer stack 100 may be used in its front windshield, side windows, and rear windshield, for example.

(Recapitulation)

A method for manufacturing a multi-layer stack (100) according to a first aspect includes bonding a transparent plate (20) to an outer surface (11, 12) of at least one of a first glass panel (1) or a second glass panel (2) of a glass panel unit (10) with an intermediate film (30) interposed between the outer surface (11, 12) and the transparent plate (20). The glass panel unit (10) includes: the first glass panel (1); the second glass panel (2); and an evacuated space (3) provided between the first glass panel (1) and the second glass panel (2). A plurality of spacers (4) are provided in the evacuated space (3) between the first glass panel (1) and the second glass panel (2). A pressure applied for bonding the glass panel unit (10) and the transparent plate (20) together is less than a compressive strength of the plurality of spacers (4).

This aspect provides a multi-layer stack (100) with excellent mechanical strength and thermal insulation properties. In particular, this aspect reduces the chances of the spacers (4) of the glass panel unit (10) collapsing under pressure when the glass panel unit (10) and the transparent plate (20) are bonded together.

In a method for manufacturing a multi-layer stack (100) according to a second aspect, which may be implemented in conjunction with the first aspect, the plurality of spacers (4) are made of a resin.

This aspect may make the compressive strength of the spacers (4) less than the compressive strength of the first glass panel (1) and the compressive strength of the second glass panel (2). This reduces, even if the pressure for bonding the glass panel unit (10) and the transparent plate

(20) goes beyond a required level, the chances of the first glass panel (1) or the second glass panel (2) being broken under the excessive pressure.

In a method for manufacturing a multi-layer stack (100) according to a third aspect, which may be implemented in conjunction with the first or second aspect, the transparent plate (20) includes a first transparent plate (21) and a second transparent plate (22). The intermediate film (30) includes a first intermediate film (31) and a second intermediate film (32). The method includes: bonding an outer surface (11) of the first glass panel (1) and the first transparent plate (21) with the first intermediate film (31) interposed between the outer surface (11) of the first glass panel (1) and the first transparent plate (21); and bonding an outer surface (12) of the second glass panel (2) and the second transparent plate (22) with the second intermediate film (32) interposed between the outer surface (12) of the second glass panel (2) and the second transparent plate (22).

This aspect provides a multi-layer stack (100) with particularly excellent mechanical strength and thermal insulation properties.

In a method for manufacturing a multi-layer stack (100) according to a fourth aspect, which may be implemented in conjunction with any one of the first to third aspects, the pressure applied for bonding the glass panel unit (10) and the transparent plate (20) together falls within a range from 0.2 atmosphere ($\simeq$0.02 MPa) to 3 atmosphere ($\simeq$0.3 MPa).

This aspect particularly significantly reduces the chances of the spacers (4) of the glass panel unit (10) collapsing under pressure.

A method for manufacturing a multi-layer stack (100) according to a fifth aspect, which may be implemented in conjunction with any one of the first to fourth aspects, includes arranging, in a bag (40), the glass panel unit (10), the intermediate film (30), and the transparent plate (20), and bonding the glass panel unit (10) and the transparent plate (20) together with the intermediate film (30) interposed between the glass panel unit (10) and the transparent plate (20) while evacuating the bag (40).

This aspect enables applying pressure uniformly to the intermediate film (30). This reduces the chances of the intermediate film (30) losing its transparency or producing bubbles therein.

A method for manufacturing a multi-layer stack (100) according to a sixth aspect, which may be implemented in conjunction with the fifth aspect, includes heating the bag (40), in which the glass panel unit (10), the intermediate film (30), and the transparent plate (20) are put, in a furnace (7) with the bag (40) placed in a flat position on a base (73) having a ventilation space (730).

This aspect allows the base (73) to be heated more efficiently by letting hot air in the furnace (7) pass through the ventilation space (730). This allows the bag (40), in which the glass panel unit (10), the intermediate film (30), and the transparent plate (20) are put, to be heated not only from over the bag (40) but also from under the bag (40), thus facilitating heating the bag (40) from both sides. Consequently, the intermediate film (30) may be heated uniformly.

In a method for manufacturing a multi-layer stack (100) according to a seventh aspect, which may be implemented in conjunction with the sixth aspect, the base (73) is made of a material having a better thermal conductivity than the bag (40).

This aspect facilitates transferring the heat of the hot air, passing through the ventilation space (730), to the bag (40) more efficiently via the base (73). Thus, the intermediate film (30) may be heated even more uniformly.

A method for manufacturing a multi-layer stack (100) according to an eighth aspect, which may be implemented in conjunction with the fifth aspect, includes heating the bag (40), in which the glass panel unit (10), the intermediate film (30), and the transparent plate (20) are put, in a furnace (7) with the bag (40) placed in an upright position.

This aspect facilitates heating the bag (40) from both sides, thus allowing the intermediate film (30) to be uniformly heated more easily.

In a method for manufacturing a multi-layer stack (100) according to a ninth aspect, which may be implemented in conjunction with any one of the first to eighth aspects, the intermediate film (30) contains at least one resin selected from the group consisting of a polyvinyl butyral (PVB) resin, an ethylene vinyl acetate (EVA) copolymer resin, an ionomer resin, a cycloolefin resin, and a polyolefin resin.

According to this aspect, making the intermediate film (30) of a PVB resin increases the mechanical strength and anti-penetration ability of the multi-layer stack (100). On the other hand, making the intermediate film (30) of an EVA resin increases the handleability and anti-scattering ability of the multi-layer stack (100). Furthermore, making the intermediate film (30) of an ionomer resin not only facilitates the manufacturing process of the multi-layer stack (100) but also increases the mechanical strength of the overall multi-layer stack (100). Furthermore, making the intermediate film (30) of a cycloolefin resin facilitates the manufacturing process of the multi-layer stack (100). Furthermore, making the intermediate film (30) of a polyolefin resin not only increases the anti-scattering ability of the multi-layer stack (100) but also enables bonding the glass panel unit (10) and the transparent plate (20) together with the intermediate film (30) at a relatively low temperature. In addition, this also increases the transportability of the multi-layer stack (100).

In a method for manufacturing a multi-layer stack (100) according to a tenth aspect, which may be implemented in conjunction with the ninth aspect, the intermediate film (30) contains the polyvinyl butyral resin, and the method includes drying the intermediate film (30) to a moisture content falling within a range from 0.1% by weight to 0.5% by weight before bonding the glass panel unit (10) and the transparent plate (20) together.

This aspect allows bonding the glass panel unit (10) and the transparent plate (20) with the intermediate film (30) only by heating and may also reduce the deformation of the spacers (4) included in the glass panel unit (10) and other inconveniences. In addition, this also reduces the chances of the intermediate film (30) losing its transparency or producing bubbles therein.

A multi-layer stack (100) according to an eleventh aspect includes a glass panel unit (10), a first transparent plate (21), a first intermediate film (31), a second transparent plate (22), and a second intermediate film (32). The glass panel unit (10) includes: a first glass panel (1); a second glass panel (2); and an evacuated space (3) provided between the first glass panel (1) and the second glass panel (2). A plurality of spacers (4) are provided in the evacuated space (3) between the first glass panel (1) and the second glass panel (2). The first transparent plate (21) is provided for an outer surface (11) of the first glass panel (1). The first intermediate film (31) is interposed between the first glass panel (1) and the first transparent plate (21). The second transparent plate (22) is provided for an outer surface (12) of the second glass panel (2). The second intermediate film (32) is interposed between the second glass panel (2) and the second transparent plate (22).

This aspect may improve the mechanical strength, thermal insulation properties, and sound insulation properties of the multi-layer stack (100).

In a multi-layer stack (100) according to a twelfth aspect, which may be implemented in conjunction with the eleventh aspect, the plurality of spacers (4) are made of a resin.

This aspect may make the compressive strength of the spacers (4) less than the compressive strength of the first glass panel (1) and the compressive strength of the second glass panel (2). This reduces, even if the pressure for bonding the glass panel unit (10) and the transparent plate (20) goes beyond a required level, the chances of the first glass panel (1) or the second glass panel (2) being broken under the excessive pressure.

In a multi-layer stack (100) according to a thirteenth aspect, which may be implemented in conjunction with the eleventh or twelfth aspect, the first intermediate film (31) and the second intermediate film (32) are made of different materials.

This aspect improves the performance of the multi-layer stack (100) while facilitating the manufacturing process thereof.

In a multi-layer stack (100) according to a fourteenth aspect, which may be implemented in conjunction with the eleventh or thirteenth aspect, at least one of the first intermediate film (31) or the second intermediate film (32) is made of a polyvinyl butyral resin.

This aspect increases the mechanical strength and anti-penetration ability of the multi-layer stack (100).

In a multi-layer stack (100) according to a fifteenth aspect, which may be implemented in conjunction with any one of the eleventh to fourteenth aspects, at least one of the first intermediate film (31) or the second intermediate film (32) is made of an ethylene vinyl acetate copolymer resin.

This aspect increases the handleability and anti-scattering ability of the multi-layer stack (100).

In a multi-layer stack (100) according to a sixteenth aspect, which may be implemented in conjunction with any one of the eleventh to fourteenth aspects, at least one of the first intermediate film (31) or the second intermediate film (32) is made of an ionomer resin.

This aspect increases the anti-penetration ability and mechanical strength of the multi-layer stack (100).

In a multi-layer stack (100) according to a seventeenth aspect, which may be implemented in conjunction with any one of the eleventh to fourteenth aspects, at least one of the first intermediate film (31) or the second intermediate film (32) is made of a cycloolefin resin.

This aspect increases the transparency and waterproofness of the multi-layer stack (100).

In a multi-layer stack (100) according to an eighteenth aspect, which may be implemented in conjunction with any one of the eleventh to fourteenth aspects, at least one of the first intermediate film (31) or the second intermediate film (32) is made of a polyolefin resin.

This aspect allows the multi-layer stack (100) to be formed by performing bonding at an even lower temperature.

In a multi-layer stack (100) according to a nineteenth aspect, which may be implemented in conjunction with any one of the eleventh to eighteenth aspects, at least one of the first transparent plate (21) or the second transparent plate (22) includes a glass pane.

This aspect provides a multi-layer stack (100) with excellent mechanical strength and thermal insulation properties.

In a multi-layer stack (100) according to a twentieth aspect, which may be implemented in conjunction with any one of the eleventh to nineteenth aspects, at least one of the first transparent plate (21) or the second transparent plate (22) includes a polycarbonate plate.

This aspect provides a multi-layer stack (100) with excellent mechanical strength and thermal insulation properties.

Note that the features according to the second to tenth aspects are not essential features for the method for manufacturing a multi-layer stack (100) but may be omitted as appropriate. Also, the constituent elements according to the twelfth to twentieth aspects are not essential constituent elements for the multi-layer stack (100) but may be omitted as appropriate.

REFERENCE SIGNS LIST

1 First Glass Panel
2 Second Glass Panel
3 Evacuated Space
4 Spacer
7 Furnace
10 Glass Panel Unit
11 Outer Surface
12 Outer Surface
20 Transparent Plate
21 First Transparent Plate
22 Second Transparent Plate
30 Intermediate Film
31 First Intermediate Film
32 Second Intermediate Film
40 Bag
73 Base
100 Multi-Layer Stack

The invention claimed is:

1. A method for manufacturing a multi-layer stack, the method comprising:
    a step of bonding a transparent plate to an outer surface of at least one of a first glass panel or a second glass panel of a glass panel unit with an intermediate film interposed between the outer surface and the transparent plate, the glass panel unit including: the first glass panel; the second glass panel; and an evacuated space provided between the first glass panel and the second glass panel, a plurality of spacers made of a resin being provided in the evacuated space between the first glass panel and the second glass panel,
    the intermediate film containing a polyvinyl butyral resin,
    the step of bonding including:
        arranging, in a bag, the glass panel unit, the intermediate film, and the transparent plate, and
        bonding the glass panel unit and the transparent plate together with the intermediate film interposed between the glass panel unit and the transparent plate while evacuating the bag such that the intermediate film is dried to a moisture content falling within a range from 0.1% by weight to 0.5% by weight before the glass panel unit and the transparent plate are bonded together as a result of the decrease in humidity in the bag according to the evacuating,
    wherein a pressure applied for bonding the glass panel unit and the transparent plate together is less than a compressive strength of the plurality of spacers.

2. The method of claim 1, wherein
    the transparent plate includes a first transparent plate and a second transparent plate,
    the intermediate film includes a first intermediate film and a second intermediate film,
    the method includes:
    bonding an outer surface of the first glass panel and the first transparent plate with the first intermediate film interposed between the outer surface of the first glass panel and the first transparent plate; and bonding an outer surface of the second glass panel and the second transparent plate with the second intermediate film interposed between the outer surface of the second glass panel and the second transparent plate.

3. The method of claim 1, wherein
the pressure applied for bonding the glass panel unit and the transparent plate together falls within a range from 0.2 atmosphere to 3 atmosphere.

4. The method of claim 1, comprising heating the bag, in which the glass panel unit, the intermediate film, and the transparent plate are put, in a furnace with the bag placed in a flat position on a base having a ventilation space.

5. The method of claim 4, wherein
the base is made of a material having a better thermal conductivity than the bag.

6. The method of claim 1, comprising heating the bag, in which the glass panel unit, the intermediate film, and the transparent plate are put, in a furnace with the bag placed in an upright position.

7. A multi-layer stack comprising:
a glass panel unit including: a first glass panel; a second glass panel; and an evacuated space provided between the first glass panel and the second glass panel, a plurality of spacers made of a resin being provided in the evacuated space between the first glass panel and the second glass panel;
a first transparent plate provided for an outer surface of the first glass panel;
a first intermediate film interposed between the first glass panel and the first transparent plate;
a second transparent plate provided for an outer surface of the second glass panel; and
a second intermediate film interposed between the second glass panel and the second transparent plate,
wherein the first glass panel and the first transparent plate are bonded together with the first intermediate film interposed between the first glass panel and the first transparent plate,
wherein the second glass panel and the second transparent plate are bonded together with the second intermediate film interposed between the second glass panel and the second transparent plate,
wherein one of the first intermediate film or the second intermediate film is made of a polyvinyl butyral resin and the other one of the first intermediate film or the second intermediate film is made of an ethylene vinyl acetate copolymer resin, and
wherein the intermediate film which is the one of the first intermediate film or the second intermediate film that is made of a polyvinyl butyral resin has a moisture content falling within a range from 0.1% by weight to 0.5% by weight.

8. The multi-layer stack of claim 7, wherein
at least one of the first transparent plate or the second transparent plate includes a glass pane.

9. The multi-layer stack of claim 7, wherein
at least one of the first transparent plate or the second transparent plate includes a polycarbonate plate.

* * * * *